US012245303B2

(12) United States Patent
Babaei

(10) Patent No.: US 12,245,303 B2
(45) Date of Patent: Mar. 4, 2025

(54) RADIO LINK CONTROL (RLC) ENHANCEMENTS FOR MULTICAST AND BROADCAST SERVICES

(71) Applicant: Toyota Jidosha Kabushiki Kaisha, Aichi-ken (JP)

(72) Inventor: Alireza Babaei, Fairfax, VA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 604 days.

(21) Appl. No.: 17/453,629

(22) Filed: Nov. 4, 2021

(65) Prior Publication Data

US 2024/0064831 A1 Feb. 22, 2024

Related U.S. Application Data

(60) Provisional application No. 63/110,187, filed on Nov. 5, 2020.

(51) Int. Cl.

*H04W 76/15* (2018.01)
*H04L 5/00* (2006.01)
*H04W 72/30* (2023.01)
*H04W 72/51* (2023.01)

(52) U.S. Cl.

CPC ........... *H04W 76/15* (2018.02); *H04L 5/0048* (2013.01); *H04W 72/30* (2023.01); *H04W 72/51* (2023.01)

(58) Field of Classification Search

None

See application file for complete search history.

(56) References Cited

U.S. PATENT DOCUMENTS

2018/0279168 A1* 9/2018 Jheng ...................... H04L 5/001
2018/0324642 A1* 11/2018 Yu ......................... H04L 5/0053
2020/0235869 A1* 7/2020 Pradas .................. H04L 1/1867
2021/0126745 A1* 4/2021 Kadiri ................... H04L 1/1832
2021/0194714 A1* 6/2021 Kadiri ..................... H04W 4/08
2022/0166539 A1* 5/2022 Bergman .................. H04L 1/08
2022/0217506 A1* 7/2022 Xu .......................... H04W 4/06
2022/0338291 A1* 10/2022 Hong .................... H04W 72/30
2023/0199569 A1* 6/2023 Cao ......................... H04W 4/06 370/331
2023/0284099 A1* 9/2023 Xu ........................ H04W 76/12 370/331
2023/0299882 A1* 9/2023 Wu ....................... H04L 1/1887 370/329

OTHER PUBLICATIONS

ETSI TS 138 322, "Technical Specification: Radio Link Control (RLC) protocol specification", 3GPP TS 38.322 version 15.3.0, Release 15, Sep. 2018, 34 pages, downloadable from http://www.etsi.org/standards-search.

(Continued)

*Primary Examiner* — Saumit Shah

(74) *Attorney, Agent, or Firm* — Finnegan, Henderson, Ferabow, Garrett and Dunner LLP

(57) ABSTRACT

A system, method and apparatus for wireless communications is provided. A user equipment (UE) receives control information including first configuration parameters and second configuration parameters. The UE receives a packet associated with the MBS radio bearer and determines a decoding result associated with the decoding the received packet. The UE processes a decoding result according to an acknowledgement mode.

24 Claims, 26 Drawing Sheets

(56) References Cited

OTHER PUBLICATIONS

ETSI TS 138 331, "5G: NR; Radio Resource Control (RRC); Protocol specification", 3GPP TS 38.331 version 16.1.0 Release 16, (Jul. 2020), 886 pages, (part 1, pp. 1-296), downloadable from http://www.etsi.org/stardards-search.

ETSI TS 138 331, "5G: NR; Radio Resource Control (RRC); Protocol specification", 3GPP TS 38.331 version 16.1.0 Release 16, (Jul. 2020), 886 pages, (part 2, pp. 297-591), downloadable from http://www.etsi.org/standards-search.

ETSI TS 138 331, "5G: NR; Radio Resource Control (RRC); Protocol specification", 3GPP TS 38.331 version 16.1.0 Release 16, (Jul. 2020), 886 pages, (part 3, pp. 592-886), downloadable from http://www.etsi.org/standards-search.

* cited by examiner

| Logical channel \ Transport channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Logical channel \ Transport channel | UL-SCH | RACH |
|---|---|---|
| CCCH | X | |
| DCCH | X | |
| DTCH | X | |

FIG. 3B

| Logical channel \ Transport channel | SL-BCH | SL-SCH |
|---|---|---|
| SBCCH | X | |
| SCCH | | X |
| STCH | | X |

FIG. 3C

| Transport channel \ Physical channel | PDSCH | PDCCH | PBCH |
|---|---|---|---|
| BCH | | | X |
| PCH | X | | |
| DL-SCH | X | | |

FIG. 4A

| Transport channel \ Physical channel | PUSCH | PUCCH | PRACH |
|---|---|---|---|
| UL-SCH | X | | |
| RACH | | | X |

FIG. 4B

| Transport channel \ Physical channel | PSSCH | PSCCH | PSFCH | PSBCH |
|---|---|---|---|---|
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

RADIO LINK CONTROL (RLC) ENHANCEMENTS FOR MULTICAST AND BROADCAST SERVICES

CROSS-REFERENCE TO RELATED APPLICATION

This application claims the benefit of U.S. Provisional Application No. 63/110,187, entitled "RADIO LINK CONTROL (RLC) ENHANCEMENTS FOR MULTICAST AND BROADCAST SERVICES", and filed on Nov. 5, 2020. U.S. Provisional Application No. 63/110,187 is incorporated by reference herein.

BACKGROUND

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
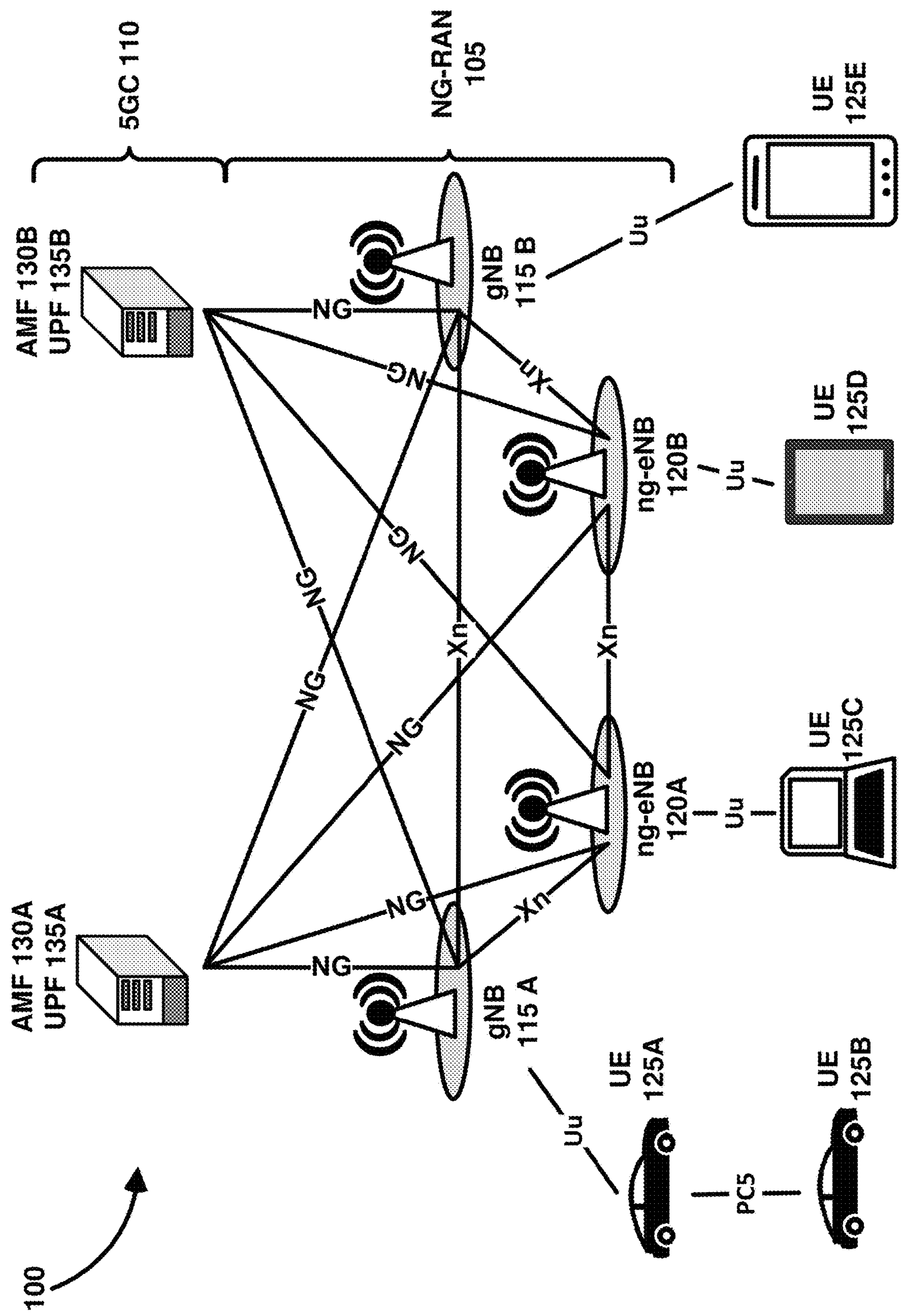
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, HOT devices, etc. Other names may be used for UEs such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing &, forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
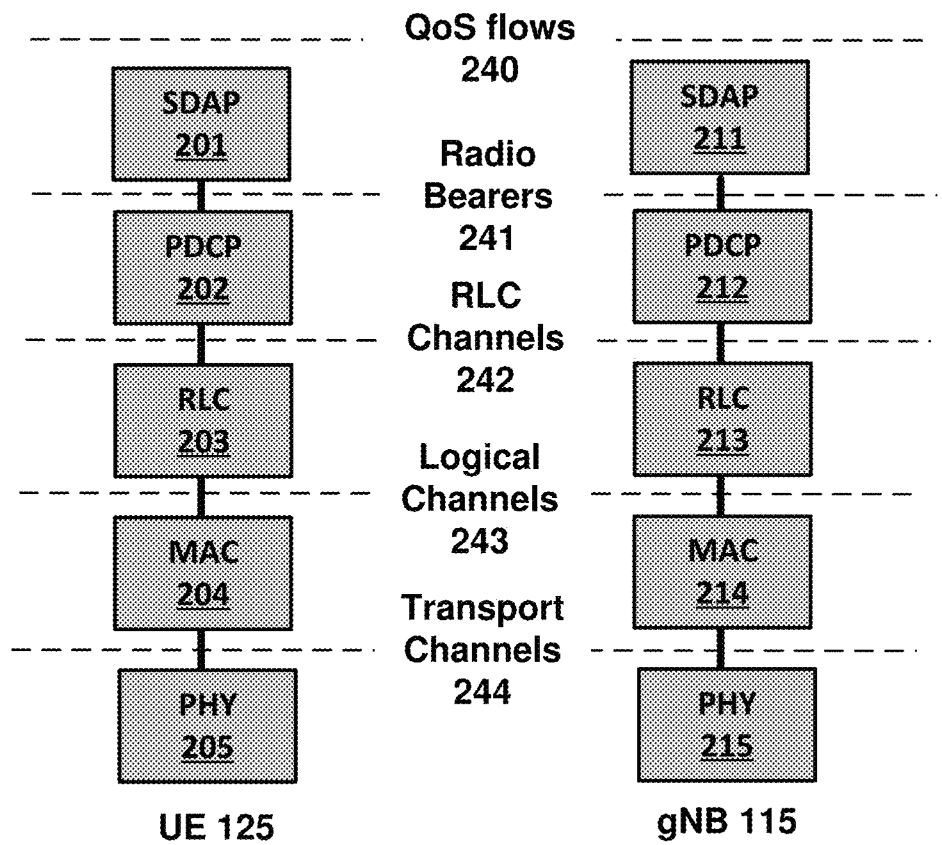
FIG. 2A and FIG. 2B show examples of radio protocol stacks for user plane and control plane, respectively, according to some aspects of some of various exemplary embodiments of the present disclosure.
Figure 2B:
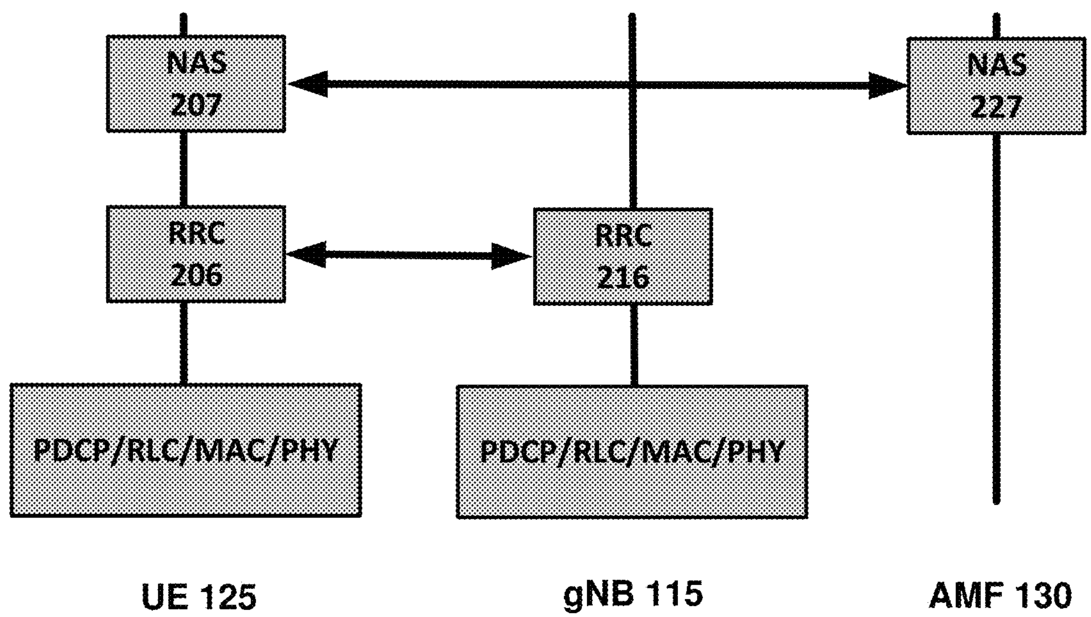

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
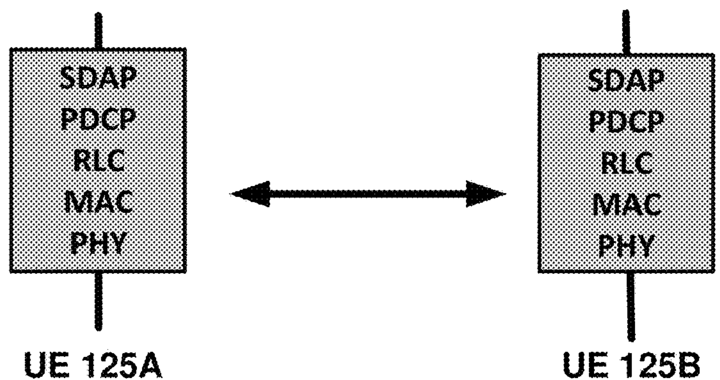
FIG. 5A, FIG. 5B, FIG. 5C and FIG. 5D show examples of radio protocol stacks for NR sidelink communication according to some aspects of some of various exemplary embodiments of the present disclosure.
Figure 5B:
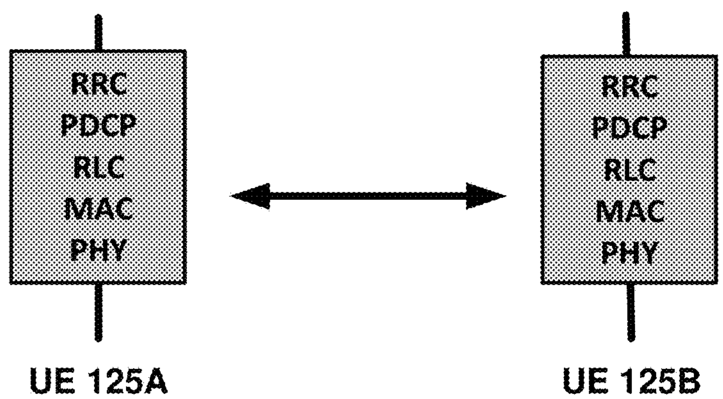
Figure 5C:
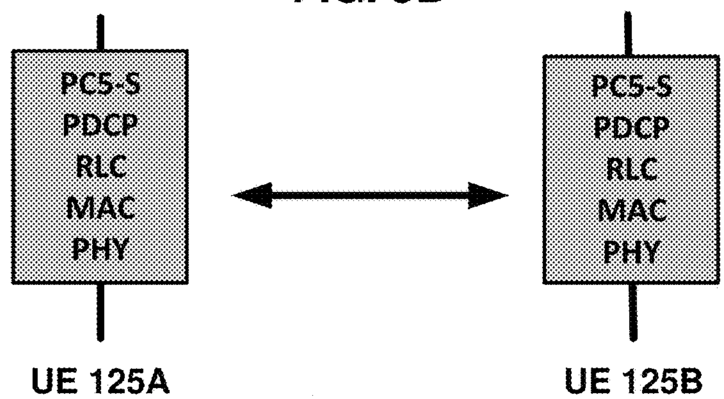
Figure 5D:
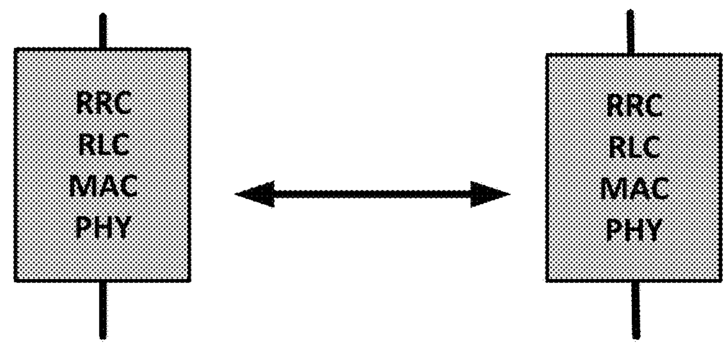

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
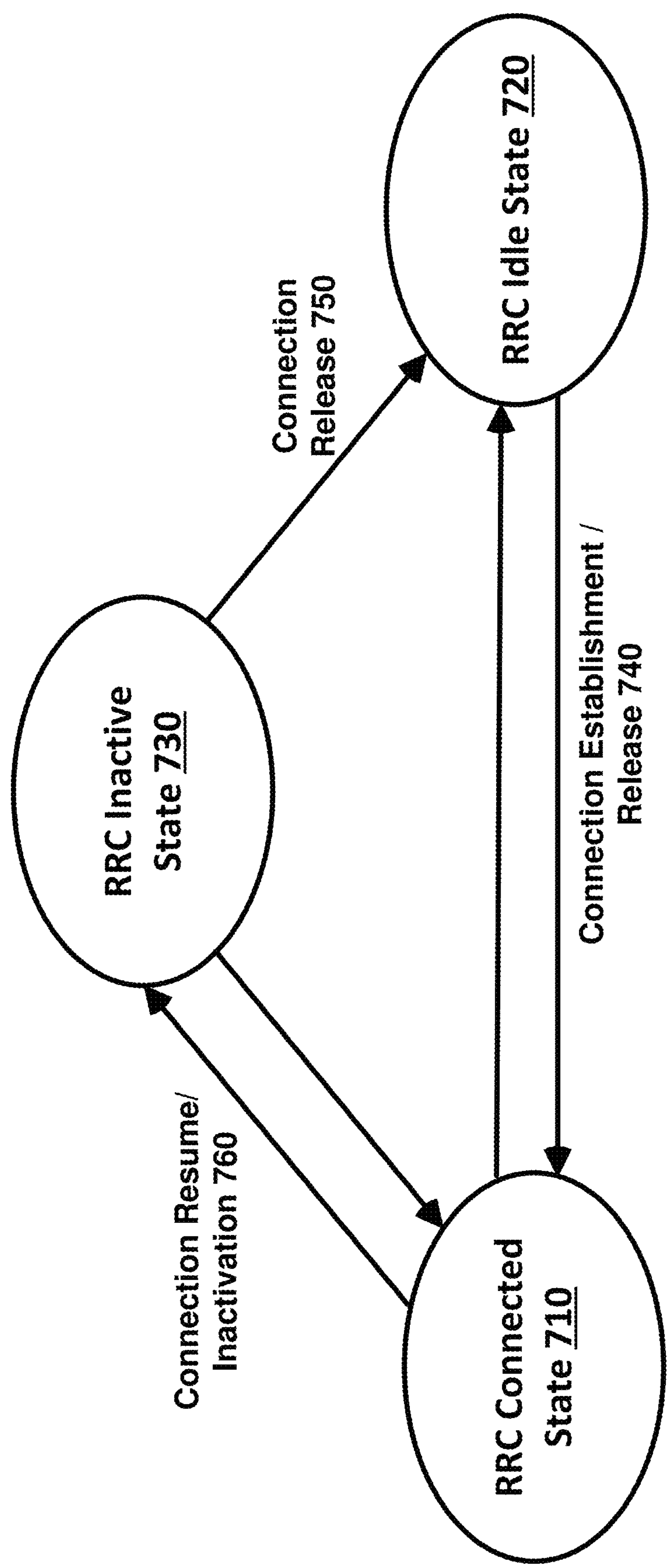
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
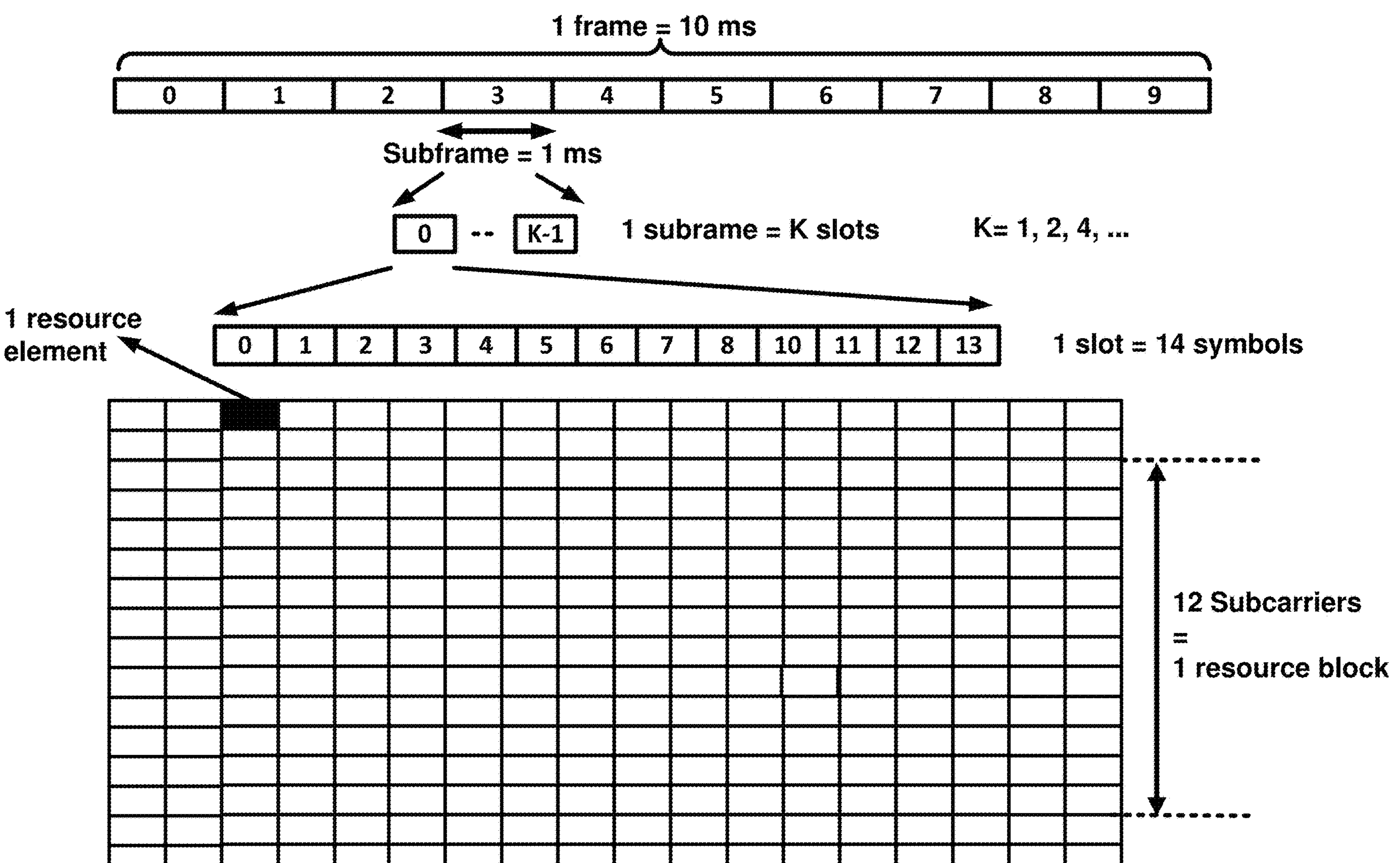
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
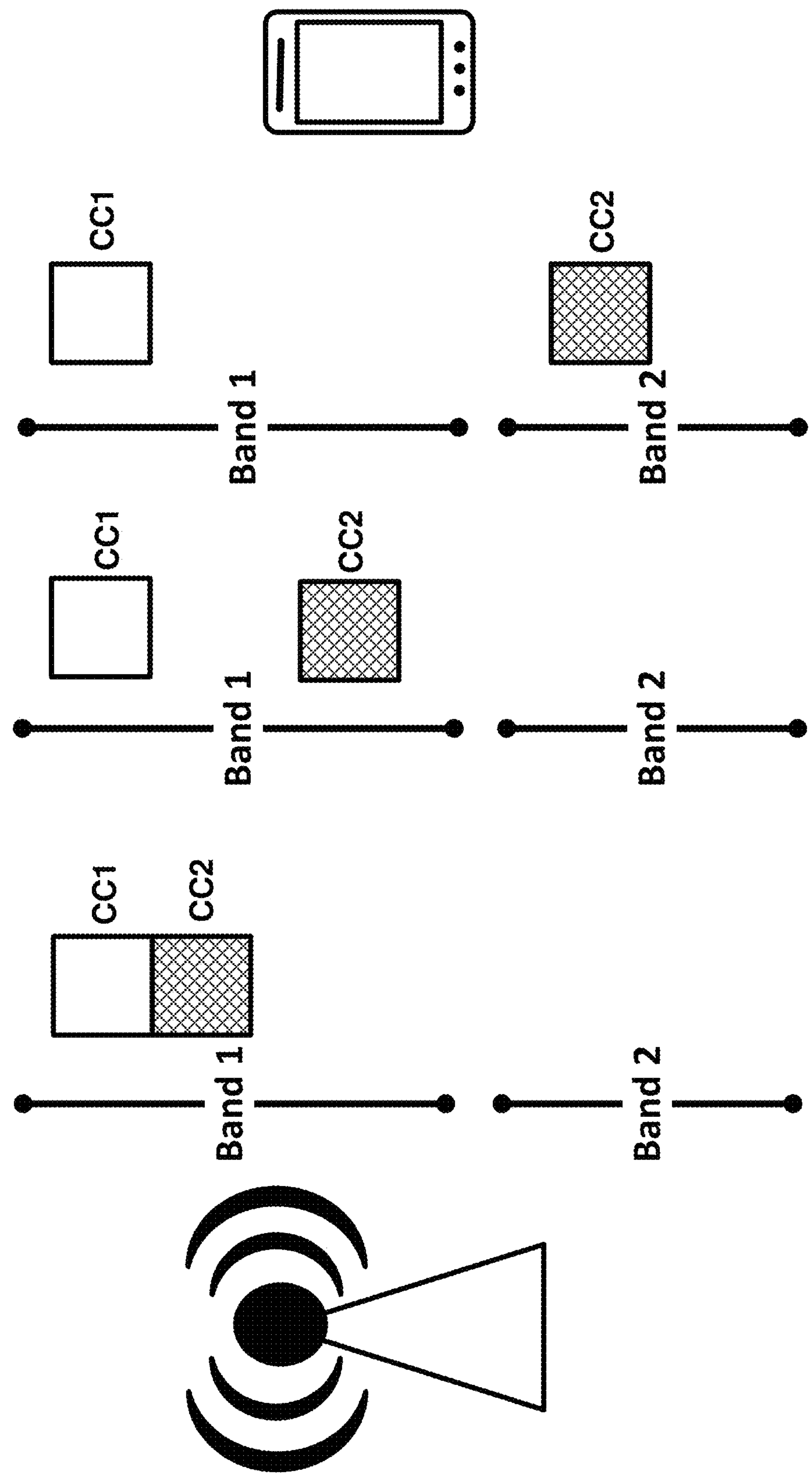
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
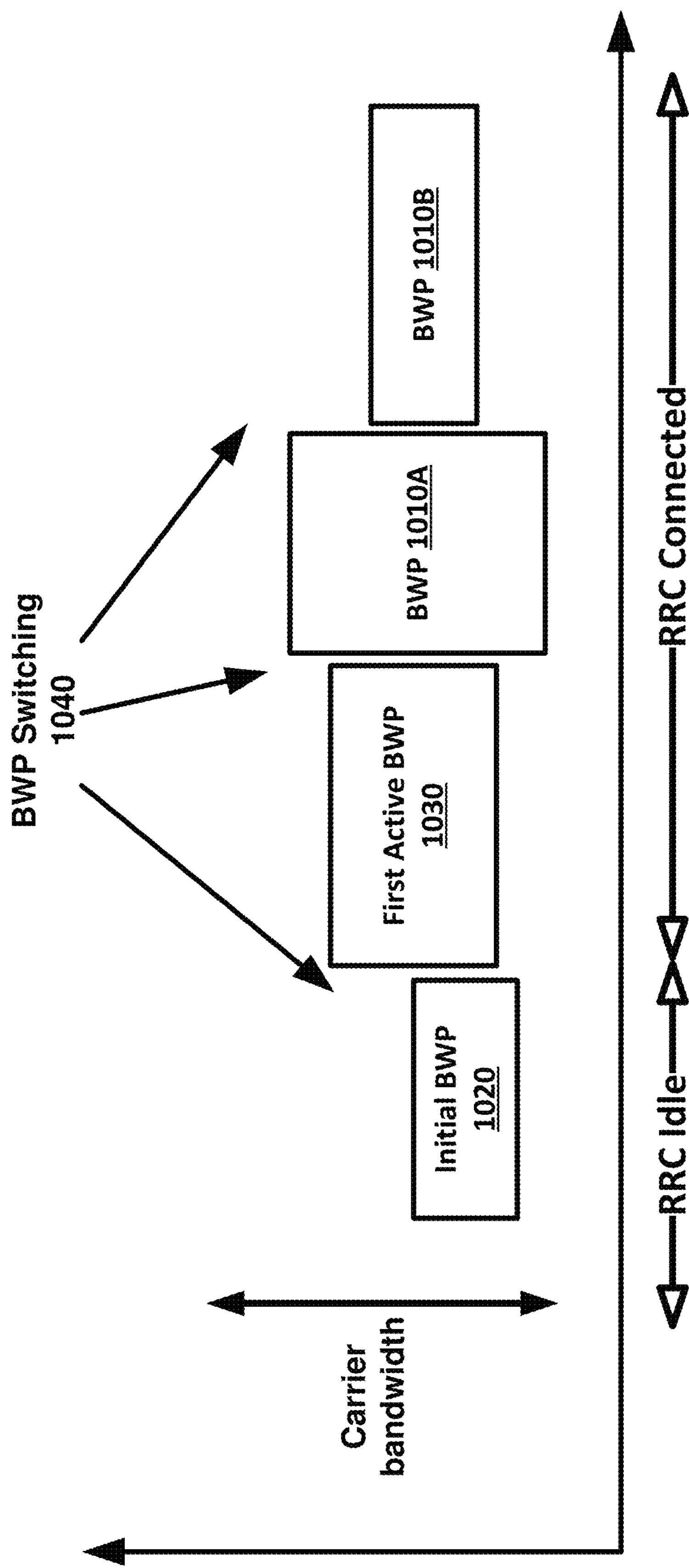
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
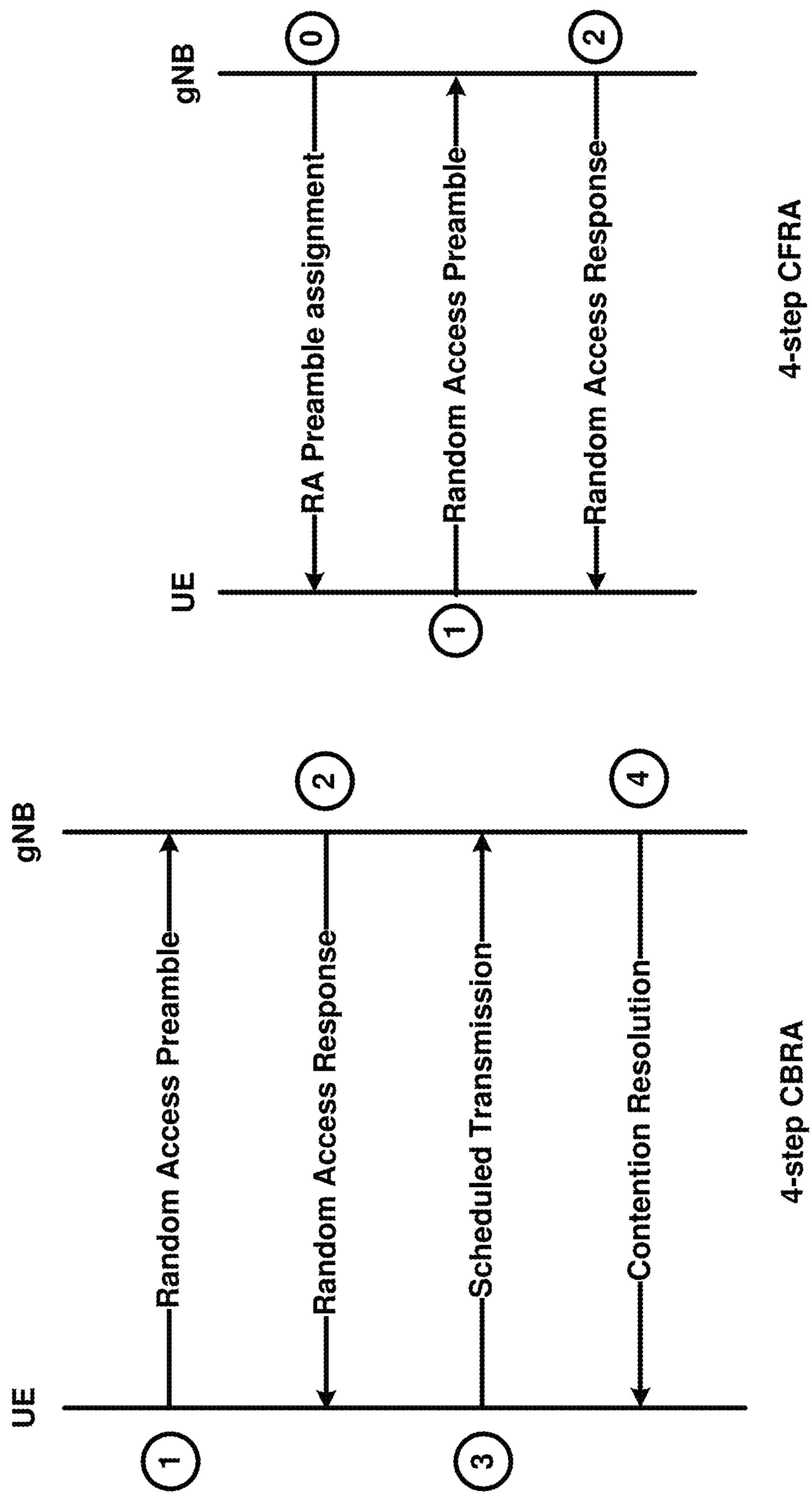
FIG. 11 shows example four-step contention-based and contention-free random access processes according to some aspects of some of various exemplary embodiments of the present disclosure.
Figure 12:
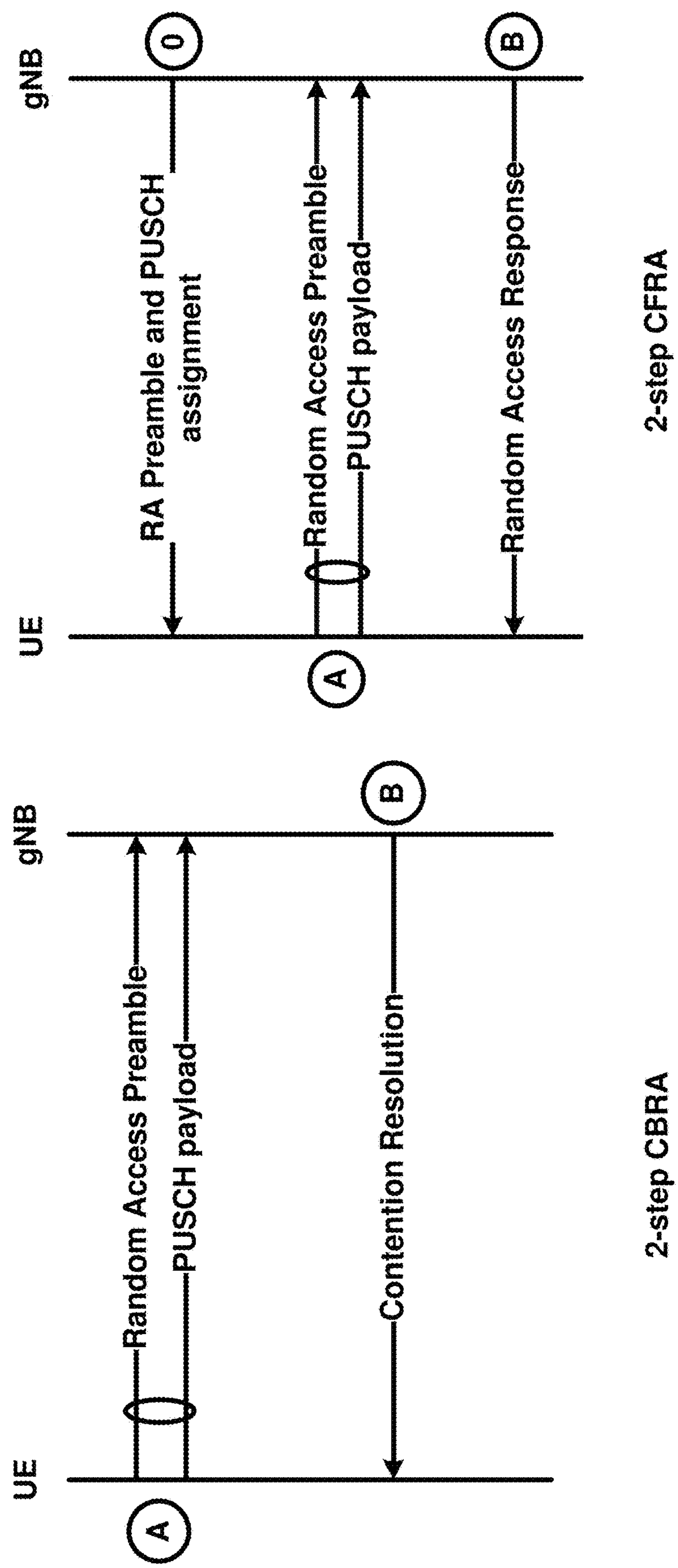
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re) transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
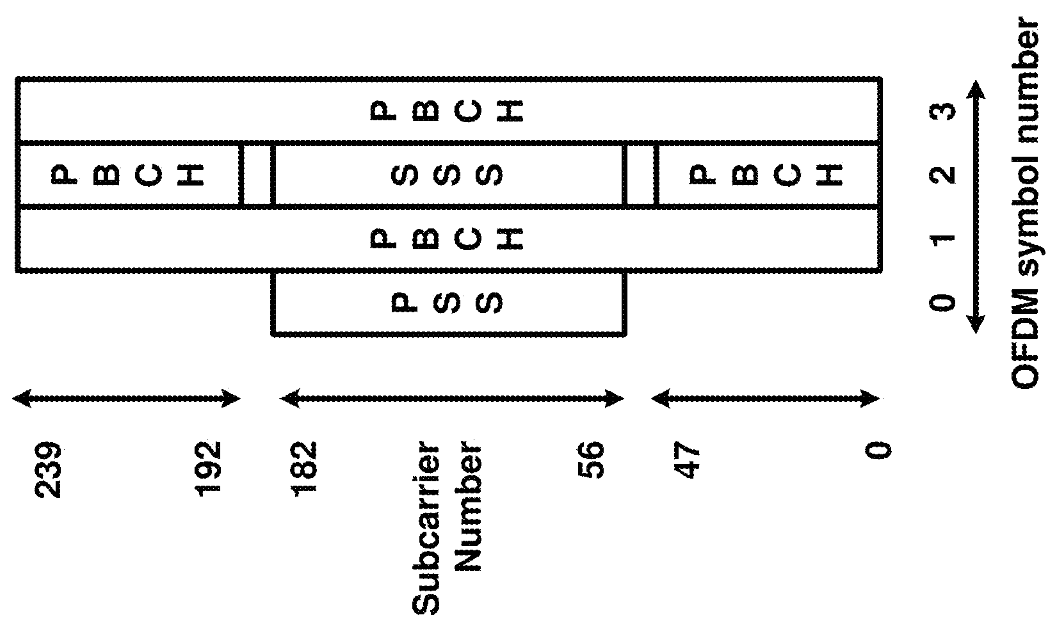
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
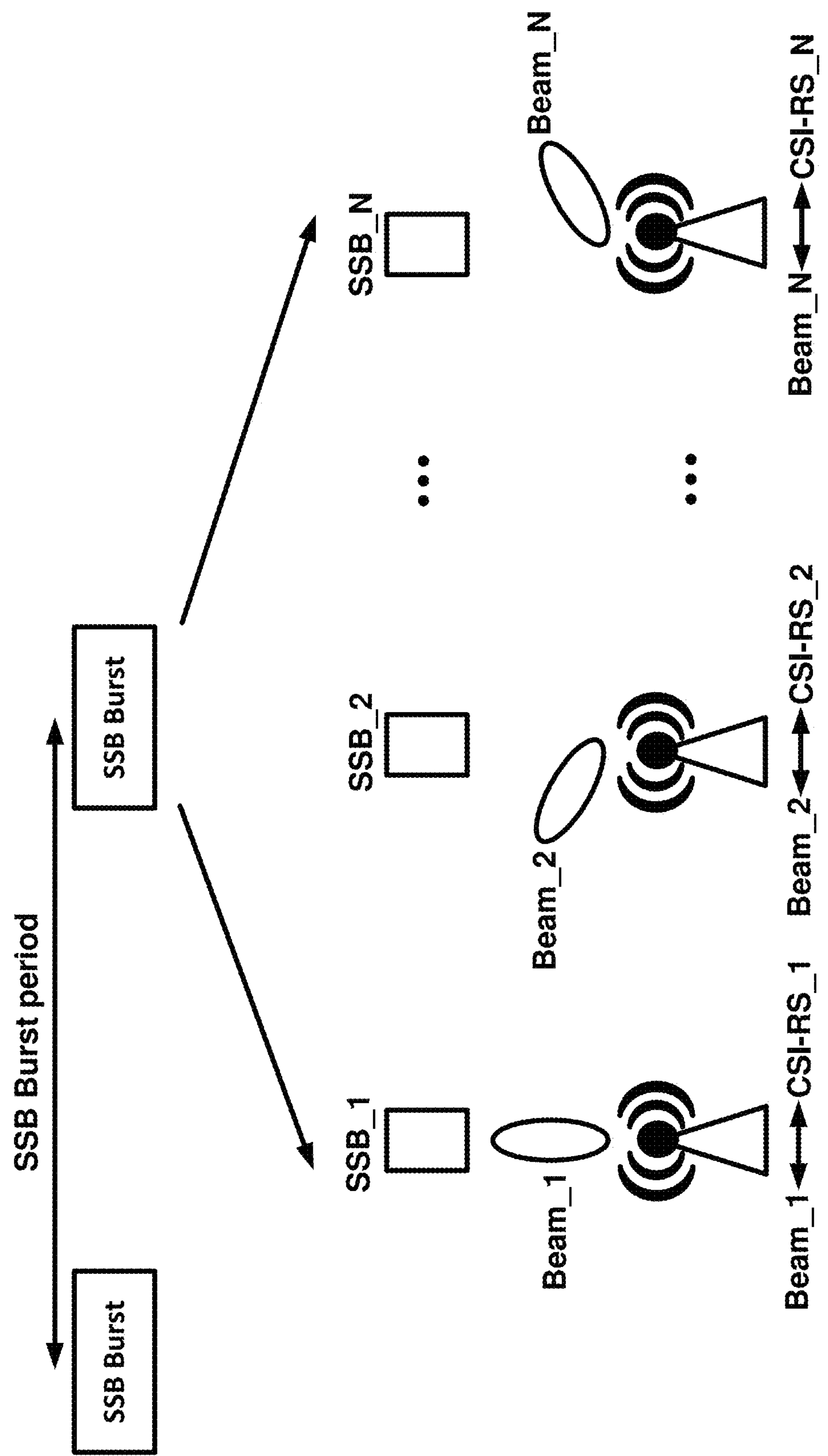
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
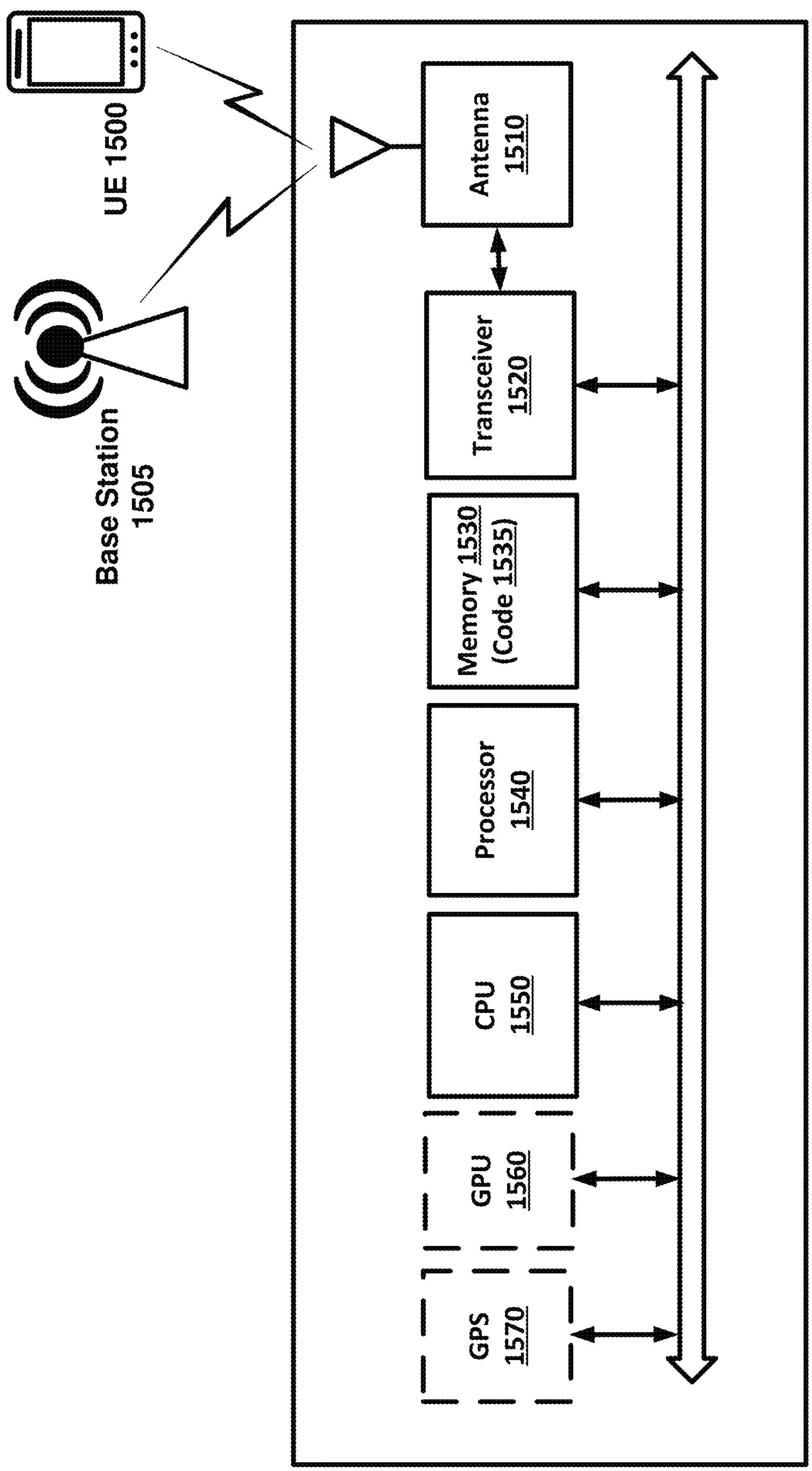
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment 1500. Accordingly, the components illustrated in FIG. 15 are not necessarily limited to either a user equipment or base station.

The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some example, MBS services may be enabled via single-cell transmission. MBS may be transmitted in the coverage of a single cell. One or more Multicast/Broadcast control channels (e.g., MCCHs) and one or more Multicast/Broadcast data channels (e.g., MTCHs) may be mapped on DL-SCH. The scheduling may be done by the gNB. The Multicast/Broadcast control channel and the Multicast/Broadcast data channel transmissions may be indicated by a logical channel specific RNTI on PDCCH. In some examples, a one-to-one mapping between a service identifier such as a temporary mobile group identifier (TMGI) and a RAN level identifier such as a group identifier (G-RNTI) may be used for the reception of the DL-SCH to which a Multicast/Broadcast data channel may be mapped. In some examples, a single transmission may be used for DL-SCH associated with the Multicast/Broadcast control channel and/or the Multicast/Broadcast data channel transmissions and HARQ or RLC retransmissions may not be used and/or an RLC Unacknowledged Mode (RLC UM) may be used. In other examples some feedback (e.g., HARQ feedback or RLC feedback) may be used for transmissions via Multicast/Broadcast control channel and/or Multicast/Broadcast data channels.

In some example, for Multicast/Broadcast data channel, the following scheduling information may be provided on Multicast/Broadcast control channel: a Multicast/Broadcast data channel scheduling cycle, a Multicast/Broadcast data channel on-duration (e.g., duration that the UE waits for, after waking up from DRX, to receive PDCCHs), a Multicast/Broadcast data channel inactivity timer (e.g., duration that the UE waits to successfully decode a PDCCH, from the last successful decoding of a PDCCH indicating the DL-SCH to which this Multicast/Broadcast data channel is mapped, failing which it re-enters DRX).

In some examples, one or more UE identities may be related to MBS transmissions. The one or more identities may comprise at least one of: one or more first RNTIs that identify transmissions of the Multicast/Broadcast control channel; one or more second RNTIs that identify transmissions of a Multicast/Broadcast data channels. The one or more first RNTIs that identify transmissions of the Multicast/Broadcast control channel may comprise a single cell RNTI (SC-RNTI, other names may be used). The one or more second RNTIs that identify transmissions of a Multicast/Broadcast data channels may comprise a G-RNTI (nG-RNTI or other names may be used).

In some examples, one or more logical channels may be related to MBS transmissions. The one or more logical channels may comprise a Multicast/Broadcast control channel. The Multicast/Broadcast control channel may be a point-to-multipoint downlink channel used for transmitting MBS control information from the network to the UE, for one or several Multicast/Broadcast data channel. This channel may be used by UEs that receive or are interested to receive MBS. The one or more logical channels may comprise a Multicast/Broadcast data channel. This channel may be a point-to-multipoint downlink channel for transmitting MBS traffic data from the network.

Figure 16:
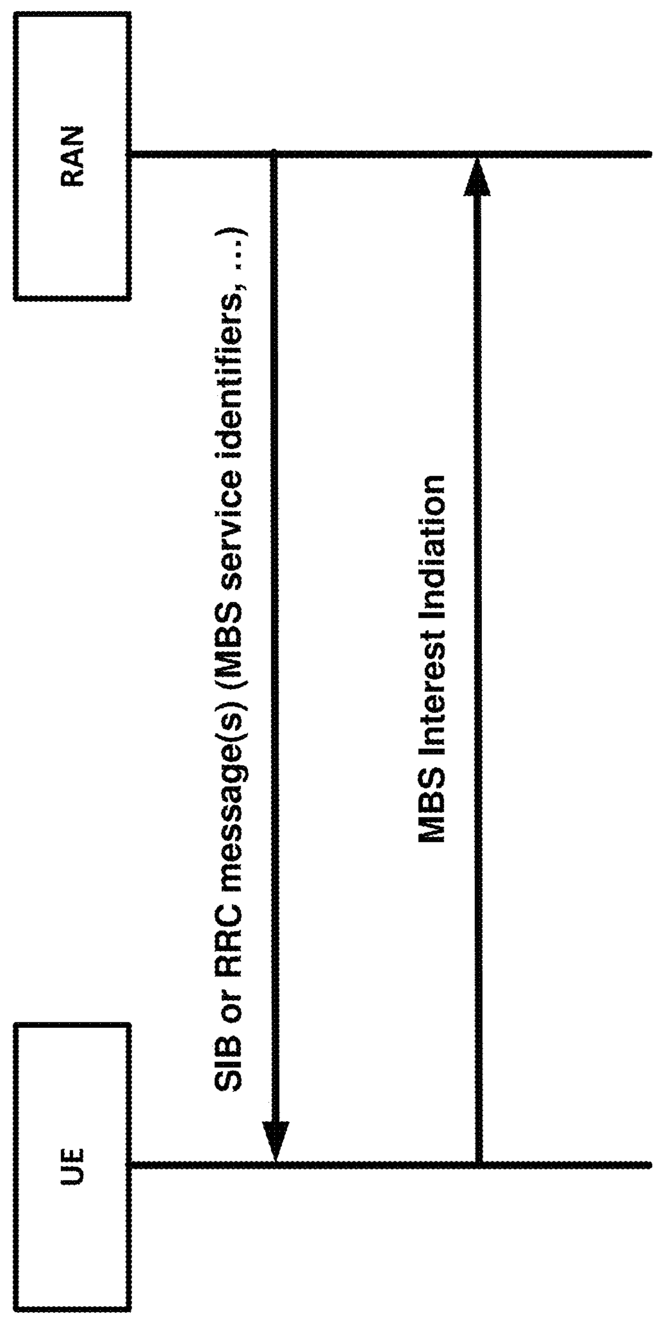
FIG. 16 shows an example multicast broadcast service (MBS) interest indication according to some aspects of some of various exemplary embodiments of the present disclosure.

In some examples, a procedure may be used by the UE to inform RAN that the UE is receiving or is interested to receive MBS service(s) via an MBS radio bearer, and if so, to inform the 5G RAN about the priority of MBS versus unicast reception or MBS service(s) reception in receive only mode. An example is shown in FIG. 16. The UE may transmit a message (e.g., an MBS interest indication message) message to inform RAN that the UE is receiving/interested to receive or no longer receiving/interested to receive MBS service(s). The UE may transmit the message based on receiving one or more messages (e.g., a SIB message or a unicast RRC message) from the network for example indicating one or more MBS Service Area Identifiers of the current and/or neighboring carrier frequencies.

In some examples, the UE may consider an MBS service to be part of the MBS services of interest if the UE is capable of receiving MBS services (e.g., via a single cell point to multipoint mechanism); and/or the UE is receiving or interested to receive this service via a bearer associated with MBS services; and/or one session of this service is ongoing or about to start; and/or at least one of the one or more MBS service identifiers indicated by network is of interest to the UE.

In some examples, control information for reception of MBS services may be provided on a specific logical channel: (e.g., a MCCH). The MCCH may carry one or more configuration messages which indicate the MBS sessions that are ongoing as well as the (corresponding) information on when each session may be scheduled, e.g., scheduling period, scheduling window and start offset. The one or more configuration messages may provide information about the neighbor cells transmitting the MBS sessions which may be ongoing on the current cell. In some examples, the UE may receive a single MBS service at a time, or more than one MBS services in parallel.

In some example, the MCCH information (e.g., the information transmitted in messages sent over the MCCH) may be transmitted periodically, using a configurable repetition period. The MCCH transmissions (and the associated radio resources and MCS) may be indicated on PDCCH.

In some examples, change of MCCH information may occur at specific radio frames/subframes/slots and/or a modification period may be used. For example, within a modification period, the same MCCH information may be transmitted a number of times, as defined by its scheduling (which is based on a repetition period). The modification period boundaries may be defined by SFN values for which SFN mod m=0, where m is the number of radio frames comprising the modification period. The modification period may be configured by a SIB or by RRC signaling.

In some examples, when the network changes (some of) the MCCH information, it may notify the UEs about the change in the first subframe/slot which may be used for MCCH transmission in a repetition period. Upon receiving a change notification, a UE interested to receive MBS services may acquire the new MCCH information starting from the same subframe/slot. The UE may apply the previously acquired MCCH information until the UE acquires the new MCCH information.

In an example, a system information block (SIB) may contain the information required to acquire the control information associated transmission of MBS. The information may comprise at least one of: one or more discontinuous reception (DRX) parameters for monitoring for scheduling information of the control information associated transmission of MBS, scheduling periodicity and offset for scheduling information of the control information associated transmission of MBS, modification period for modification of content of the control information associated transmission of MBS, repetition information for repetition of the control information associated transmission of MBS, etc.

In an example, an information element (IE) may provide configuration parameters indicating, for example, the list of ongoing MBS sessions transmitted via one or more bearers for each MBS session, one or more associated RNTIs (e.g., G-RNTI, other names may be used) and scheduling information. The configuration parameters may comprise at least one of: one or more timer values for discontinuous reception (DRX) (e.g., an inactivity timer or an On Duration timer), an RNTI for scrambling the scheduling and transmission of a Multicast/Broadcast traffic channel (e.g., MTCH, other names may be used), ongoing MBS session, one or more power control parameters, one or more scheduling periodicity and/or offset values for one or more MBS traffic channels, information about list of neighbor cells, etc.

In some examples a gNB or ng-eNB may comprise logical nodes that host some, all or parts of the user plane and/or control plane functionalities. For example, a gNB Central Unit (gNB-CU) may be a logical node hosting RRC, SDAP and PDCP protocols of the gNB or RRC and PDCP protocols of the en-gNB that controls the operation of one or more gNB-DUs. The gNB-CU may terminate the F1 interface connected with the gNB-DU. A gNB Distributed Unit (gNB-DU) may be a logical node hosting RLC, MAC and PHY layers of the gNB or en-gNB, and its operation may be partly controlled by gNB-CU. One gNB-DU may support one or multiple cells. One cell may be supported by only one gNB-DU. The gNB-DU may terminate the F1 interface connected with the gNB-CU. A gNB-CU-Control Plane (gNB-CU-CP) may be a logical node hosting the RRC and the control plane part of the PDCP protocol of the gNB-CU for an en-gNB or a gNB. The gNB-CU-CP may terminate the E1 interface connected with the gNB-CU-UP and the F1-C interface connected with the gNB-DU. A gNB-CU-User Plane (gNB-CU-UP) may be a logical node hosting the user plane part of the PDCP protocol of the gNB-CU for an en-gNB, and the user plane part of the PDCP protocol and the SDAP protocol of the gNB-CU for a gNB. The gNB-CU-UP may terminate the E1 interface connected with the gNB-CU-CP and the F1-U interface connected with the gNB-DU.

In some examples, the RRC signalling may be used for configuration and control of the radio link control (RLC) sublayer. The functions of the RLC sublayer may be performed by RLC entities. For an RLC entity configured at the gNB, there may be a peer RLC entity configured at the UE and vice versa. An RLC entity may receive/deliver RLC service data units (SDUs) from/to upper layer and may send/receive RLC PDUs to/from its peer RLC entity via lower layers.

In some examples, an RLC protocol data unit (PDU) may either be an RLC data PDU or an RLC control PDU. If an RLC entity receives RLC SDUs from upper layer, it may receive them through a single RLC channel between RLC and upper layer, and after forming RLC data PDUs from the received RLC SDUs, the RLC entity may submit the RLC data PDUs to lower layer through a single logical channel. If an RLC entity receives RLC data PDUs from lower layer, it may receive them through a single logical channel, and after forming RLC SDUs from the received RLC data PDUs, the RLC entity may deliver the RLC SDUs to upper layer through a single RLC channel between RLC and upper layer. If an RLC entity submits/receives RLC control PDUs to/from lower layer, it may submit/receive them through the same logical channel it submits/receives the RLC data PDUs through.

Figure 17:
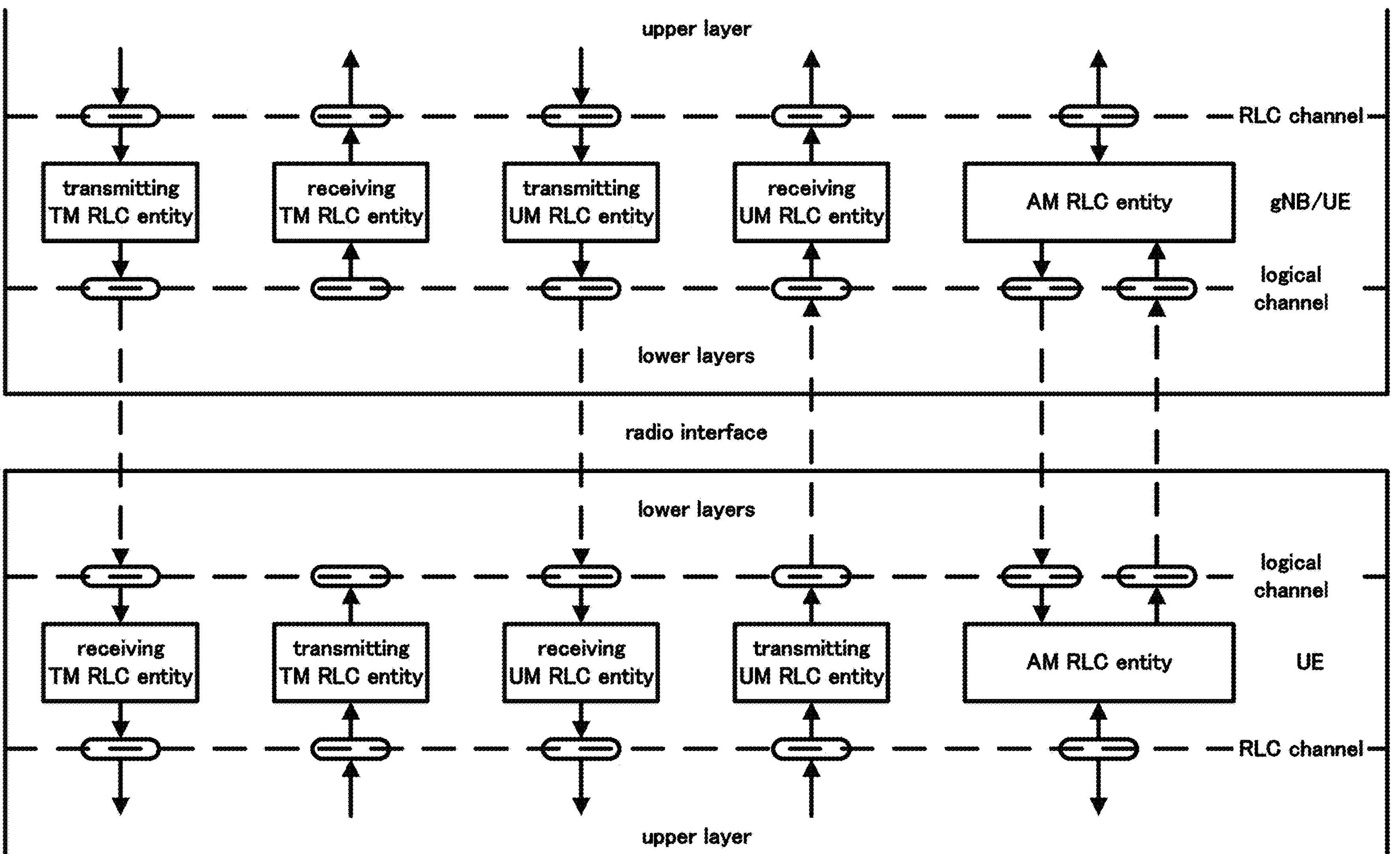
FIG. 17 shows an example overview model of the RLC sub layer according to some aspects of some of various exemplary embodiments of the present disclosure.

In some examples, an RLC entity may be configured to perform data transfer in one of the following three modes: Transparent Mode (TM), Unacknowledged Mode (UM) or Acknowledged Mode (AM). Consequently, an RLC entity may be categorized as a TM RLC entity, an UM RLC entity or an AM RLC entity depending on the mode of data transfer that the RLC entity is configured to provide. FIG. 17 illustrates the overview model of the RLC sub layer.

In some examples, a TM RLC entity may be configured either as a transmitting TM RLC entity or a receiving TM RLC entity. The transmitting TM RLC entity may receive RLC SDUs from upper layer and may send the RLC PDUs to its peer receiving TM RLC entity via lower layers. The receiving TM RLC entity may deliver RLC SDUs to upper layer and may receive RLC PDUs from its peer transmitting TM RLC entity via lower layers.

In some examples, a UM RLC entity may be configured either as a transmitting UM RLC entity or a receiving UM RLC entity. The transmitting UM RLC entity may receive RLC SDUs from upper layer and may send RLC PDUs to its peer receiving UM RLC entity via lower layers. The receiving UM RLC entity may deliver RLC SDUs to upper layer and may receive RLC PDUs from its peer transmitting UM RLC entity via lower layers.

In some examples, an AM RLC entity may comprise a transmitting side and a receiving side. The transmitting side of an AM RLC entity may receive RLC SDUs from upper layer and may send RLC PDUs to its peer AM RLC entity via lower layers. The receiving side of an AM RLC entity may deliver RLC SDUs to upper layer and may receive RLC PDUs from its peer AM RLC entity via lower layers.

In some examples, RLC SDUs of variable sizes which may be byte aligned (e.g., multiple of 8 bits) may be supported for all RLC entity types (e.g., TM, UM and AM RLC entity).

In some examples, an RLC SDU may be used to construct an RLC PDU without waiting for notification from the lower layer (e.g., by MAC) of a transmission opportunity. In the case of UM and AM RLC entities, an RLC SDU may be segmented and transported using two or more RLC PDUs based on the notification(s) from the lower layer.

In some examples, RLC PDUs may be submitted to lower layer only when a transmission opportunity has been notified by lower layer (i.e. by MAC). The UE may aim to prevent excessive non-consecutive RLC PDUs in a MAC PDU when the UE is requested to generate more than one MAC PDU.

Figure 18:
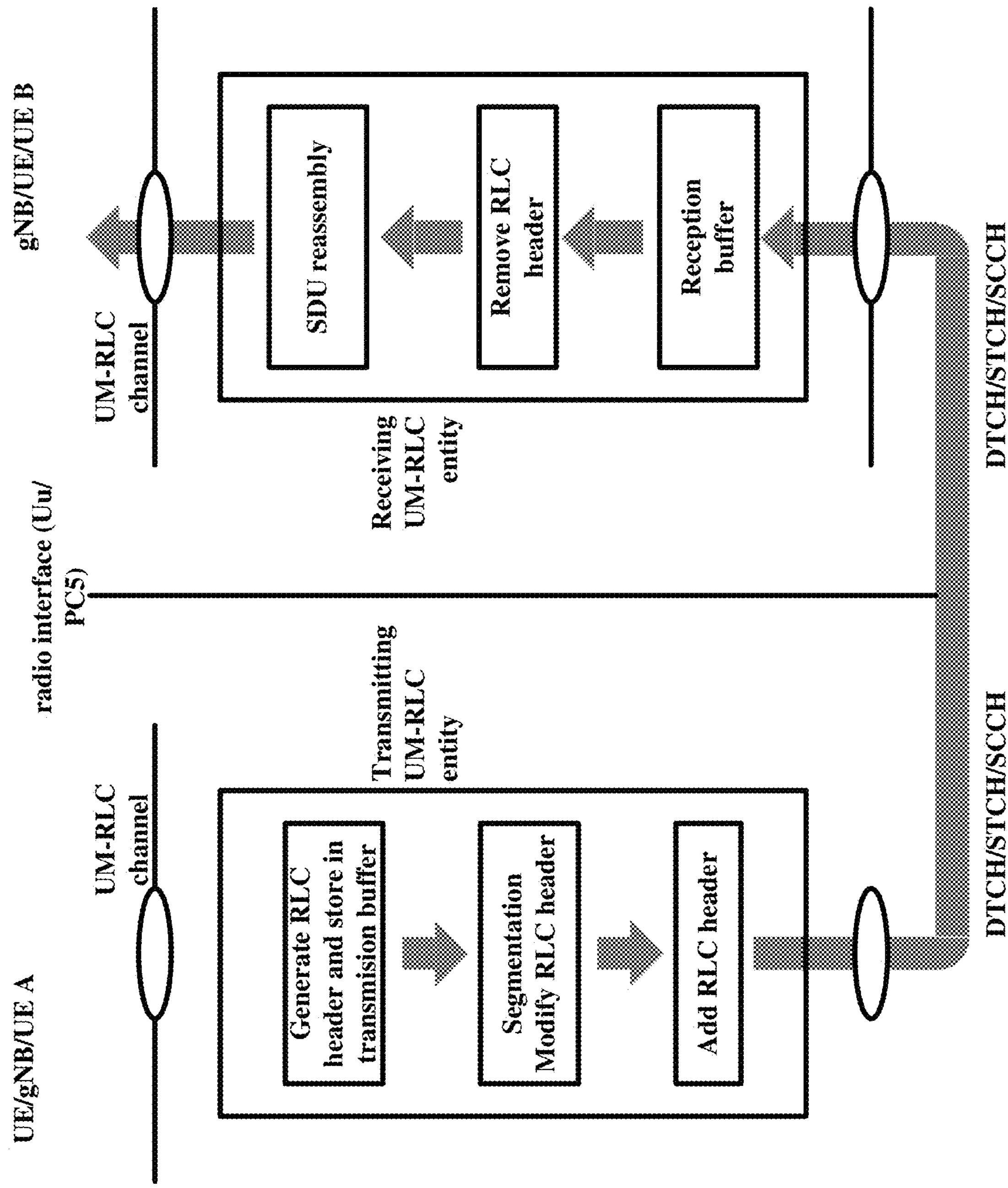
FIG. 18 shows an example model of unacknowledged mode peer entities according to some aspects of some of various exemplary embodiments of the present disclosure.

FIG. 18 shows an example model of two unacknowledged mode peer entities. In some examples, an UM RLC entity may be configured to submit/receive RLC PDUs through the following logical channels: DL/UL DTCH, SCCH, and STCH. An UM RLC entity may submit/receive the UM data PDUs (UMD PDUs). A UMD PDU may contain either one complete RLC SDU or one RLC SDU segment.

In some examples, the transmitting UM RLC entity may generate UMD PDU(s) for an RLC SDU. It may include relevant RLC headers in the UMD PDU. When notified of a transmission opportunity by the lower layer, the transmitting UM RLC entity may segment the RLC SDUs, if needed, so that the corresponding UMD PDUs, with RLC headers updated as needed, fit within the total size of RLC PDU(s) indicated by lower layer.

In some examples, when a receiving UM RLC entity receives UMD PDUs, it may: detect the loss of RLC SDU segments at lower layers; reassemble RLC SDUs from the received UMD PDUs and deliver the RLC SDUs to upper layer as soon as they are available; and may discard received UMD PDUs that cannot be re-assembled into an RLC SDU due to loss at lower layers of an UMD PDU which belonged to the particular RLC SDU.

Figure 19:
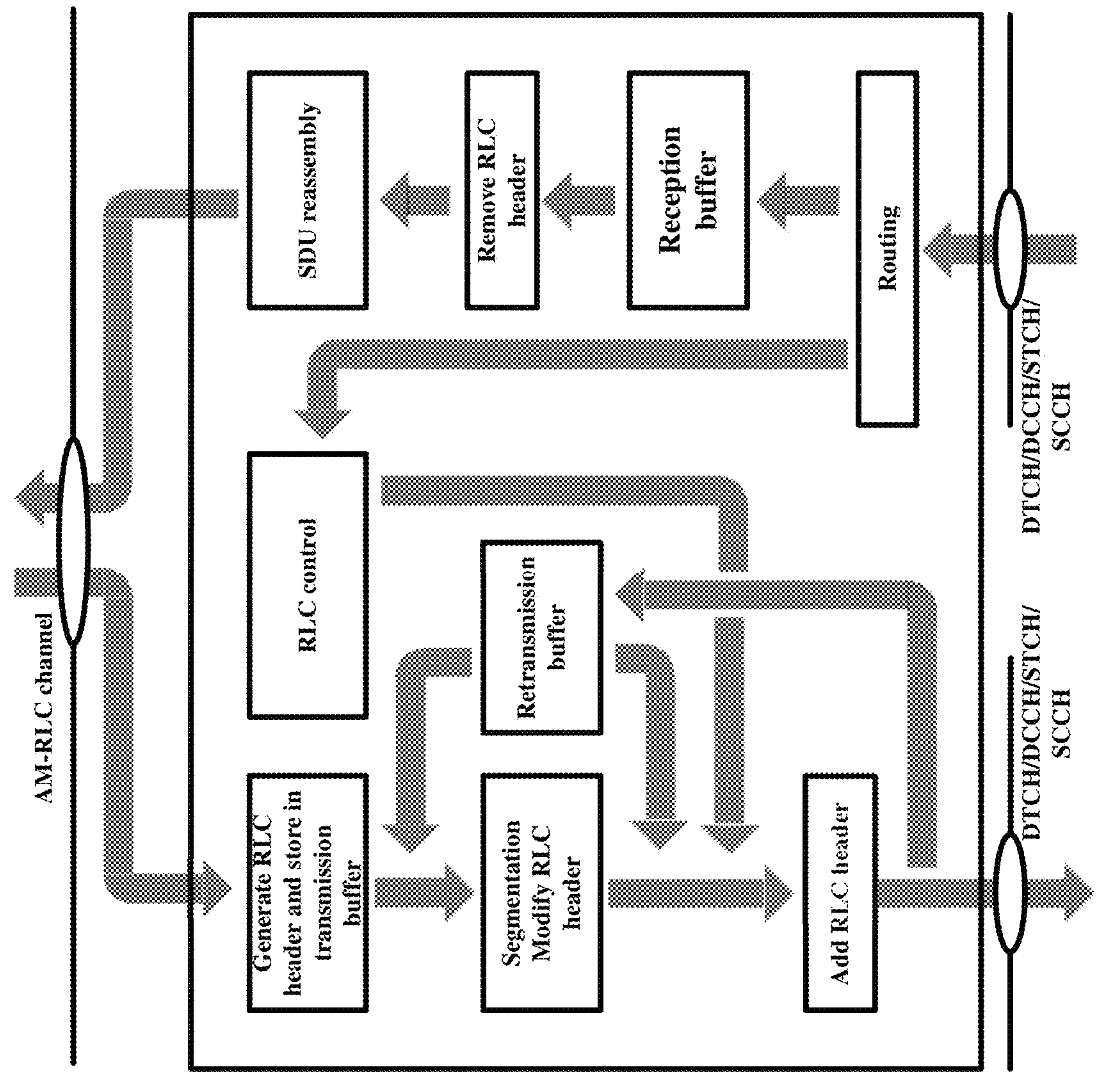
FIG. 19 shows an example model of acknowledged mode peer entities according to some aspects of some of various exemplary embodiments of the present disclosure.

FIG. 19 shows an example model of an acknowledged mode entity. In some examples, an AM RLC entity may be configured to submit/receive RLC PDUs through the following logical channels: DL/UL DCCH, DL/UL DTCH, SCCH, and STCH. An AM RLC entity may deliver/receive the AM mode (AMD) PDUs.

In some examples, an AMD PDU may contain either one complete RLC SDU or one RLC SDU segment. An AM RLC entity may deliver/receive the following RLC control PDU: STATUS PDU.

In some examples, the transmitting side of an AM RLC entity may generate AMD PDU(s) for an RLC SDU. When notified of a transmission opportunity by the lower layer, the transmitting AM RLC entity may segment the RLC SDUs, if needed, so that the corresponding AMD PDUs, with RLC headers updated as needed, fit within the total size of RLC PDU(s) indicated by lower layer.

In some examples, the transmitting side of an AM RLC entity may support retransmission of RLC SDUs or RLC SDU segments (ARQ): if the RLC SDU or RLC SDU segment to be retransmitted (including the RLC header) does not fit within the total size of RLC PDU(s) indicated by lower layer at the particular transmission opportunity notified by lower layer, the AM RLC entity may segment the RLC SDU or re-segment the RLC SDU segments into RLC SDU segments; the number of re-segmentation may not be limited.

In some examples, when the transmitting side of an AM RLC entity forms AMD PDUs from RLC SDUs or RLC SDU segments, it may include relevant RLC headers in the AMD PDU. When the receiving side of an AM RLC entity receives AMD PDUs, it may: detect whether or not the AMD PDUs have been received in duplication, and discard duplicated AMD PDUs; detect the loss of AMD PDUs at lower layers and request retransmissions to its peer AM RLC entity; and may reassemble RLC SDUs from the received AMD PDUs and deliver the RLC SDUs to upper layer as soon as they are available.

In some examples, ARQ procedures may be performed by an AM RLC entity.

In some examples, the transmitting side of an AM RLC entity may receive a negative acknowledgement (notification of reception failure by its peer AM RLC entity) for an RLC SDU or an RLC SDU segment by the following: STATUS PDU from its peer AM RLC entity.

In some examples, when receiving a negative acknowledgement for an RLC SDU or an RLC SDU segment by a STATUS PDU from its peer AM RLC entity, if the SN of the corresponding RLC SDU falls within the range TX_Next_Ack<=SN<=the highest SN of the AMD PDU among the AMD PDUs submitted to lower layer, the transmitting side of the AM RLC entity may consider the RLC SDU or the RLC SDU segment for which a negative acknowledgement was received for retransmission.

In some examples, when an RLC SDU or an RLC SDU segment is considered for retransmission, if the RLC SDU or RLC SDU segment is considered for retransmission for the first time, the transmitting side of the AM RLC entity may set the RETX_COUNT associated with the RLC SDU to zero. Otherwise, if it (the RLC SDU or the RLC SDU segment that is considered for retransmission) is not pending for retransmission already and the RETX_COUNT associated with the RLC SDU has not been incremented due to another negative acknowledgment in the same STATUS PDU, the transmitting side of the AM RLC entity may increment the RETX_COUNT.

If RETX_COUNT=maxRetxThreshold, the transmitting side of the AM RLC entity may indicate to upper layers that max retransmission has been reached.

In some examples, when retransmitting an RLC SDU or an RLC SDU segment, the transmitting side of an AM RLC entity may: if needed, segment the RLC SDU or the RLC SDU segment; form a new AMD PDU which may fit within the total size of AMD PDU(s) indicated by lower layer at the particular transmission opportunity; and submit the new AMD PDU to lower layer.

In some examples, when forming a new AMD PDU, the transmitting side of an AM RLC entity may: only map the original RLC SDU or RLC SDU segment to the Data field of the new AMD PDU; and may modify the header of the new AMD PDU.

In some examples, an AM RLC entity may poll its peer AM RLC entity in order to trigger STATUS reporting at the peer AM RLC entity.

In some examples, upon notification of a transmission opportunity by lower layer, for each AMD PDU submitted for transmission such that the AMD PDU contains either a not previously transmitted RLC SDU or an RLC SDU segment containing not previously transmitted byte segment, the transmitting side of an AM RLC entity may: increment PDU_WITHOUT_POLL by one; increment BYTE_WITHOUT_POLL by every new byte of Data field element that it maps to the Data field of the AMD PDU; and if PDU_WITHOUT_POLL>=pollPDU; or if BYTE_WITHOUT_POLL>=pollByte: include a poll in the AMD PDU.

In some examples, upon notification of a transmission opportunity by lower layer, for each AMD PDU submitted for transmission, the transmitting side of an AM RLC entity may include a poll in the AMD PDU if both the transmission buffer and the retransmission buffer becomes empty (excluding transmitted RLC SDUs or RLC SDU segments awaiting acknowledgements) after the transmission of the AMD PDU; or if no new RLC SDU may be transmitted after the transmission of the AMD PDU (e.g. due to window stalling).

In some examples, upon reception of a STATUS report from the receiving RLC AM entity the transmitting side of an AM RLC entity may stop and reset t-PollRetransmit if the STATUS report comprises a positive or negative acknowledgement for the RLC SDU with sequence number equal to POLL_SN and if t-PollRetransmit is running.

In some examples, upon expiry of t-PollRetransmit, if both the transmission buffer and the retransmission buffer are empty (excluding transmitted RLC SDU or RLC SDU segment awaiting acknowledgements); or if no new RLC SDU or RLC SDU segment can be transmitted (e.g. due to window stalling): the transmitting side of an AM RLC entity may consider the RLC SDU with the highest SN among the RLC SDUs submitted to lower layer for retransmission; or consider any RLC SDU which has not been positively acknowledged for retransmission. The transmitting side of an AM RLC entity may include a poll in an AMD PDU.

In some examples, an AM RLC entity may send STATUS PDUs to its peer AM RLC entity in order to provide positive and/or negative acknowledgements of RLC SDUs (or portions of them).

A STATUS PDU may consist of a STATUS PDU payload and an RLC control PDU header. The RLC control PDU header may consist of a D/C and a CPT field. The STATUS PDU payload may start from the first bit following the RLC control PDU header, and may consists of one ACK_SN and one E1, zero or more sets of a NACK_SN, an E1, an E2 and an E3, and possibly a pair of a SOstart and a SOend or a NACK range field for each NACK_SN.

In an example a UE may receive a PDCP-Config IE which may be used to set the configurable PDCP parameters for signaling and data radio bearers. In an example, the UE may receive an IE RadioBearerConfig which may be used to add, modify and release signaling and/or data radio bearers. Specifically, this IE may carry the parameters for PDCP and, if applicable, SDAP entities for the radio bearers. The RadioBearerConfig IE may comprise a radio bearer identifier parameter indicating an identifier of the radio bearer. In an example, the UE may receive an IE RLC-BearerConfig may be used to configure an RLC entity, a corresponding logical channel in MAC and the linking to a PDCP entity (served radio bearer). In an example, the UE may receive a RLC-Config IE that may be used to specify the RLC configuration of SRBs and DRBs.

In some examples, mechanisms may be defined to enable multicast and broadcast transmission of data within a cell and/or across multiple cells. In some examples, the mechanisms may not rely on a single frequency networks (SFN) architecture. In some examples, to support Multicast and Broadcast Service (MBS), a Single Cell PTM (SC-PTM) framework may be used. The radio link layer (RLC) may be enhanced to support multicast and broadcast bearers and their service continuities and reliable deliveries.

In some examples, the MBS bearers may be configured in accordance with a variety of modes and mode configurations. These modes include an unacknowledged mode (UM) RLC, an acknowledged mode (AM) RLC or both UM RLC and AM RLC. In some examples, for an AM RLC associated with an MBS bearer, the RLC re-transmission may be triggered as multicast or unicast. The RLC re-transmissions may be based on UEs' status reports (e.g., status PDUs). In some examples, the status PDUs may be sent by all or a subset of UEs in a multicast group.

In some examples, a single/common RLC instance at gNB or at DU may be used for an MBS bearer and the single/common RLC entity may handle transmissions to all multicast users. In other examples, one instance of RLC instance may be used per UE. In some examples, if a common RLC instance is used for an MBS bearer, a new RLC instance may be configured when MBS transmission to a UE switches to unicast.

In some examples, MBS radio bearers may support applications with widely carrying data rates and application payload sizes. The reliable delivery may be required for at least some of the use cases. The UM RLC mode with no UE feedback at the RLC layer may not enable the requirements of reliable delivery of data for at least some of the MBS applications or use cases. In some examples, an MBS radio bearer may be configured to use the RLC in UM mode or AM mode depending on the QoS and reliability requirement of associated applications. In some examples, the configuration parameters of an MBS radio bearer or an RLC instance associated with the MBS radio bearer may indicate whether the RLC is in UM mode or in AM mode.

In some examples and in case RLC is configured as UM (e.g., where there is no feedback at the RLC layer from a UE), a common RLC entity for an MBS radio bearer may be configured for all UEs. In some examples, the RLC instance across multiple distributed units (DUs) (e.g., multiple DUs of a base station) may be configured as duplicate and treated the same way. In some examples, if an MBS radio bearer is configured with RLC in UM mode, a common RLC configuration may be used for all UEs within the gNB. The RLC instances across multiple DU for the same MBS bearer may be duplicates of each other.

Figure 20:
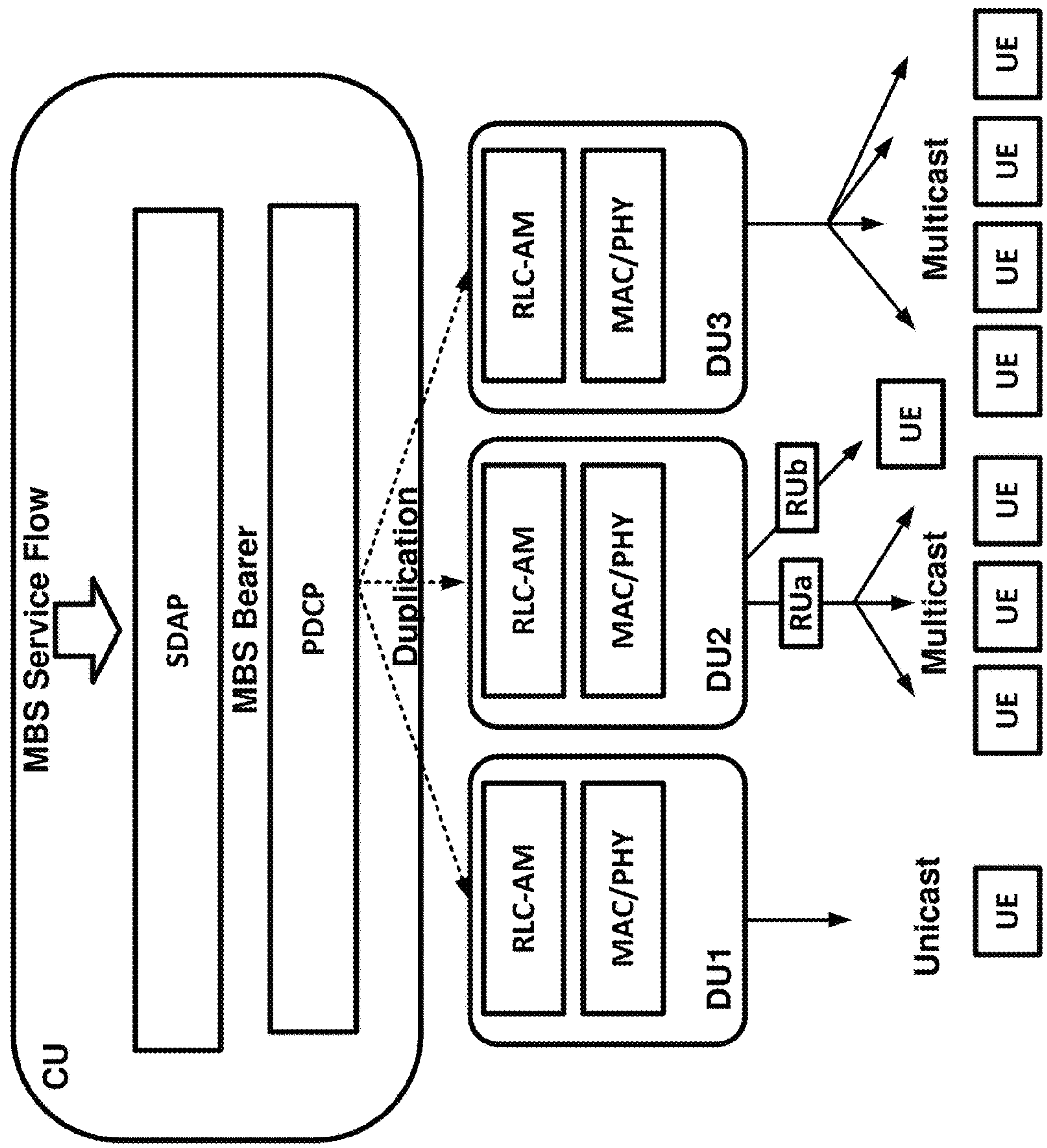
FIG. 20 shows an example process according to some aspects of some of various exemplary embodiments of the present disclosure.

In some examples, for the RLC in AM mode, given the need for unicast feedback from UEs in the MBS group, one RLC instance may be configured for each UE in the group or the common RLC instance may be used for all UEs within group for the same MBS bearer. In some examples, the RLC entities across different DUs may have the same configuration. In some examples, the RLC entities across different DUs may not be synchronized duplicates due to possible re-transmission in some DUs only. In some examples, if an MBS bearer is configured with RLC in AM, a common RLC configuration may be used for all UEs within a gNB. The RLC instances across multiple DU for the same MBR may have the same configuration but may not be synchronized due to possible layer 2 re-transmissions. In some examples, the same common RLC configured for multicast transmission to multiple UEs may be reused if data is sent as unicast by some DUs or remote units (RUs) as shown in FIG. 20.

In some examples, for operation in RLC AM mode, the RLC PDUs may be sent with sequence number in ascending order and stored in a retransmission buffer. As RLC AM supports automatic repeat request (ARQ) to ensure reliable delivery, the RLC STATUS PDU message may be sent by UE to indicate the status of RLC PDUs received at UE. During the control process, if an RLC entity receives NACK or if the RLC entity does not receive a status PDU response from a peer RLC entity for a particular RLC PDU (e.g., for a certain period of time), the stored RLC packet in the retransmission buffer may be retransmitted.

In some examples, the transmission of layer 2 ACK/NACK or RLC status report may cause excessive signalling overhead and reduce the UE's power saving if the layer 2 ACK/NACK or the RLC status report are transmitted from a large number of UEs in the multicast group. In some examples, the RLC status reporting for the MBS data by a UE may be conditioned and/or limited to negative acknowledgement (NACK) reporting only. In some examples, the RLC status reporting for the MBS data by a UE may be based on the UE distance to the gNB and/or the path loss experienced by the UE.

In some examples, if the RLC status reporting is limited to NACK reporting, the RLC entity at the gNB may not receive a status PDU (e.g. if all RLC PDUs are received correctly). In some examples with NACK only reporting, if an RLC re-transmission is needed, the RLC at gNB may receive a NACK from at least some UEs. The use of retransmission timers may not be needed when NACK only feedback is configured for RLC. In some examples, for an MBS bearer, during the control process, if the common RLC does not receive a status PDU for a particular RLC PDU associated with the MBS bearer, from peer RLC entities across all UEs in the group, the timer based RLC retransmission of the packet in the buffer may not be used. If a UE has not transmitted an RLC status report for a missing RLC PDU, the UE may ignore a retransmission of such packets by the gNB.

In some examples with common RLC instance, the retransmission of an RLC PDU may be in unicast or multicast mode. When a single UE sends a RLC status PDU indicating a missing packet, the gNB may retransmit only to that UE or the gNB may multicast the data again and those UEs which received the original packet may ignore the retransmission. In some examples, when several UEs send RLC status report indicating NACK/missing packet, the gNB may multicast the packet to all UEs. In some examples, the gNB may determine to multicast or unicast transmission of missing packets based on UEs RLC status reports.

Figure 21:
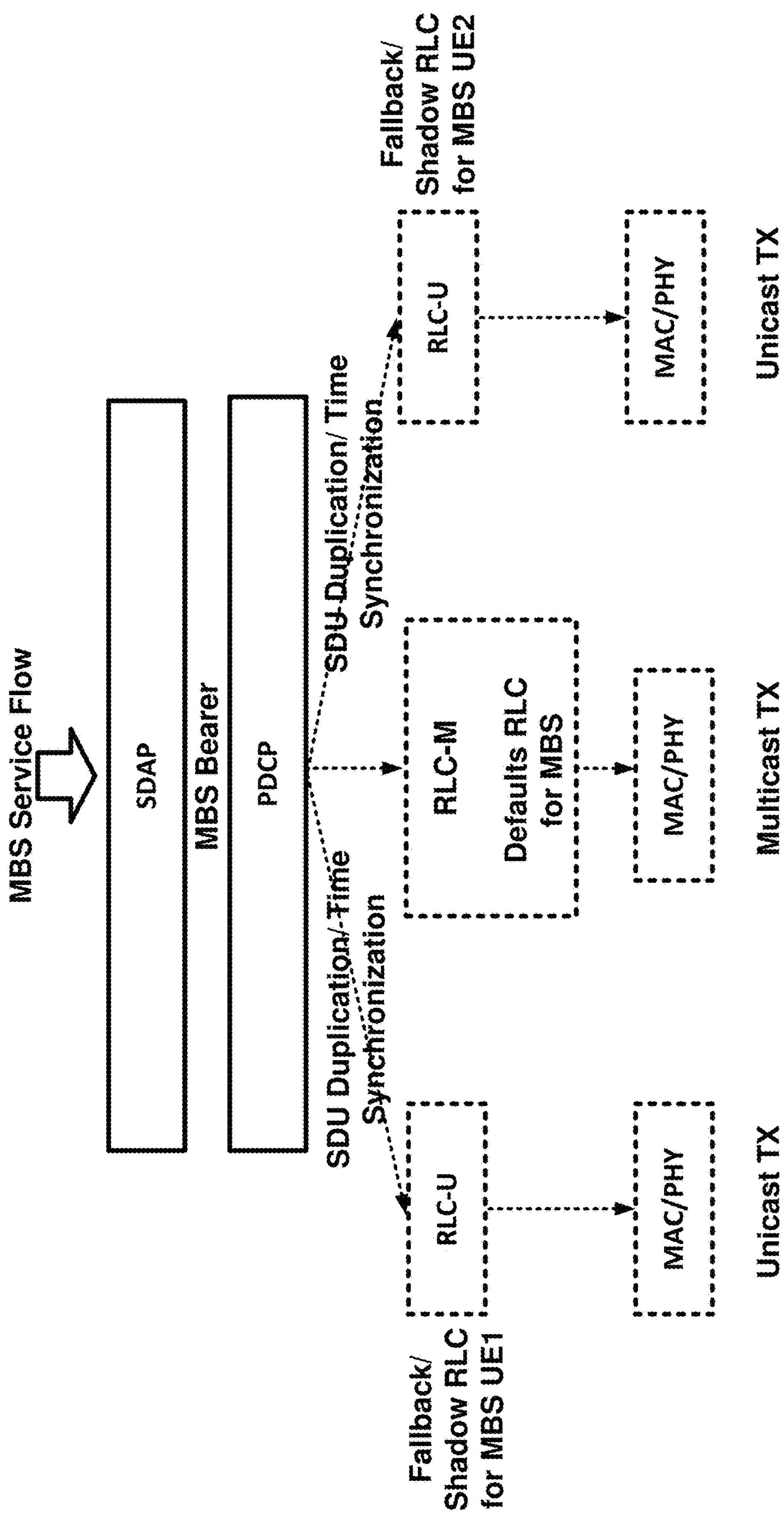
FIG. 21 shows an example process according to some aspects of some of various exemplary embodiments of the present disclosure.

In some examples, in case of common RLC, the gNB may identify and track the UE(s) which have sent a negative RLC status PDU so that the RLC retransmissions may be targeted as unicast to such UEs. In some examples, based on MBS requirements the RAN may concurrently deliver the same MBS data to some UEs in unicast manner if they cannot reliably receive the multicast data. To support these two cases and also other cases involving mix of unicast and multicast delivery to UEs in a multi-cell deployments, a shadow or backup UE dedicated RLC entity may be configured for MBS bearers in addition to common RLC as shown in FIG. 21. The gNB may configure a dedicated shadow RLC instance with a separate identity per UE in addition to the common RLC to support reliable delivery of MBS data for a given MBS bearer.

Figure 22:
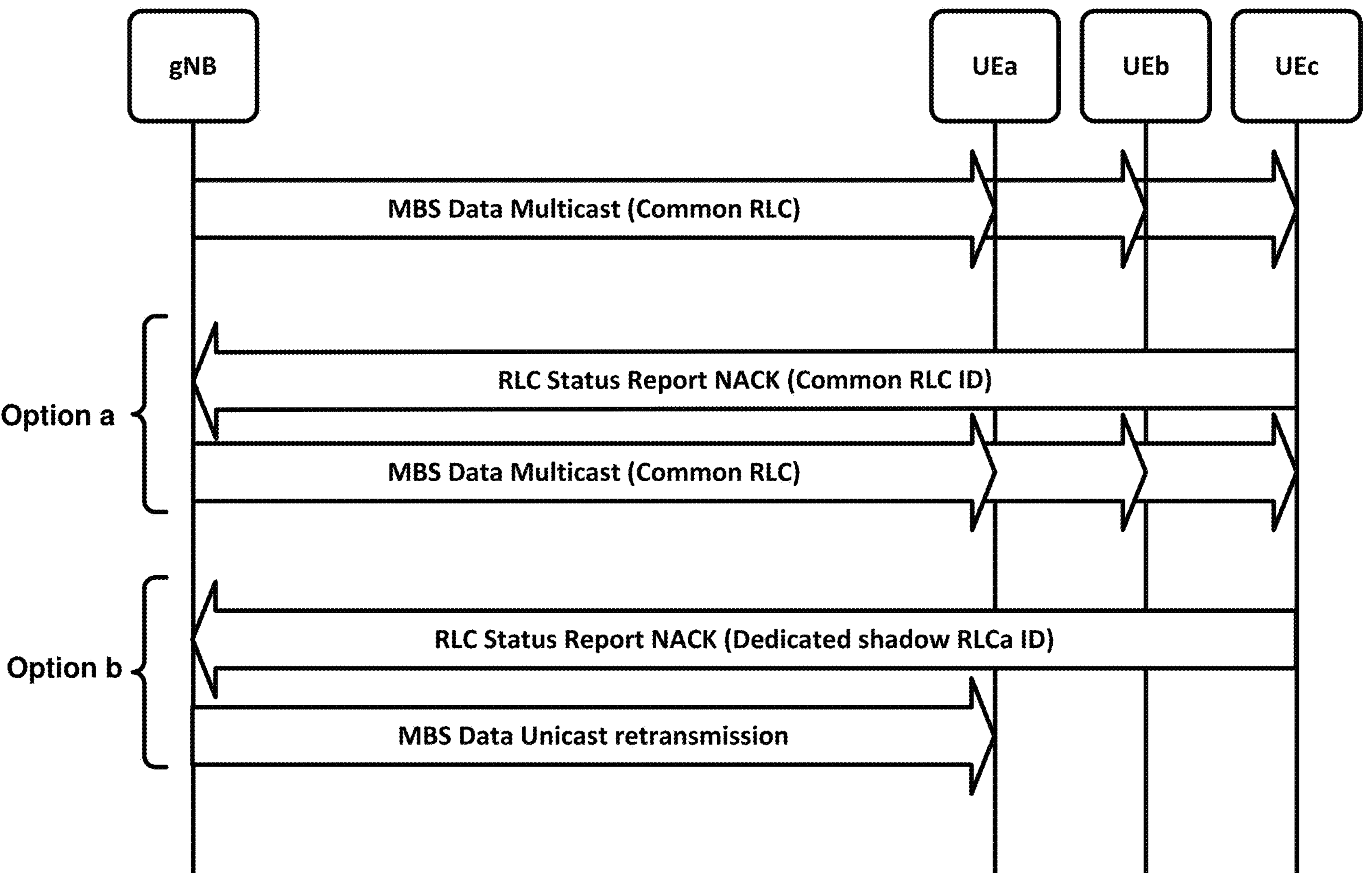
FIG. 22 shows example processes according to some aspects of some of various exemplary embodiments of the present disclosure.

In some examples, the common RLC in AM mode may be used for transmission of MBS data. Re-transmissions may be triggered if any RLC status PDU is received indicating missing packet. As shown in FIG. 22, option A or option B may be used to how handle retransmissions. In option A, the UEs may use the common RLC entity identifier in their status reports and gNB/DU may multicast the retransmission of layer 2 RLC PDUs regardless of how many negative RLC status PDUs are received. In option B, the UEs may use their dedicated shadow RLC entity identifier in the status reports and gNB/DU may unicast data to those users.

Figure 23:
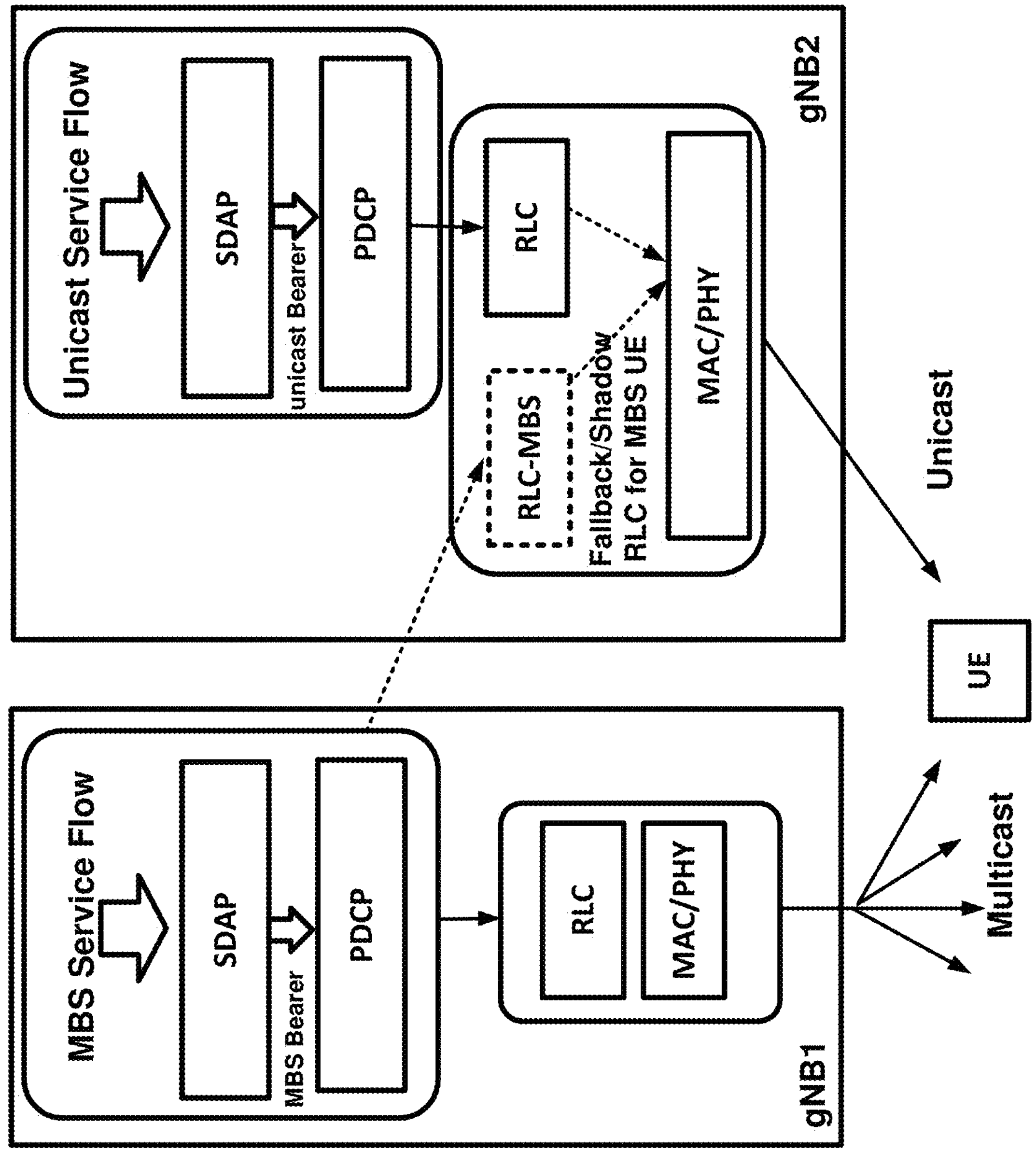
FIG. 23 shows an example process according to some aspects of some of various exemplary embodiments of the present disclosure.

In some examples, the shadow RLC may be initially dormant and may be synchronized with common RLC during normal operation and may be activated and used if unicast retransmission of MBS data is needed. In some examples, the shadow RLC may be upgraded to main RLC for a UE when MBS data is only delivered in unicast mode. In some examples as shown in FIG. 23, the shadow RLC may be configured in a secondary cell/DU if the UE is in dual connectivity between an MBS cell/DU and a unicast only cell/DU and the MBS layer 2 data retransmission may be sent on the unicast cell or eventually move to that cell due to UE mobility.

In some examples, given that the shadow RLC may be initially synchronized with common RLC, there may not be an impact on starting/stopping of an RLC timers such as status prohibit timer or reassembly timer as they will be reused when carried over to unicast RLC. Given the shadow RLC is already configured and in synch with the common RLC, a switching between multicast and unicast may be supported without loss of data and with low latency. Such transition if within one DU may become transparent to PDCP in the central unit (CU) of the base station.

Figure 24:
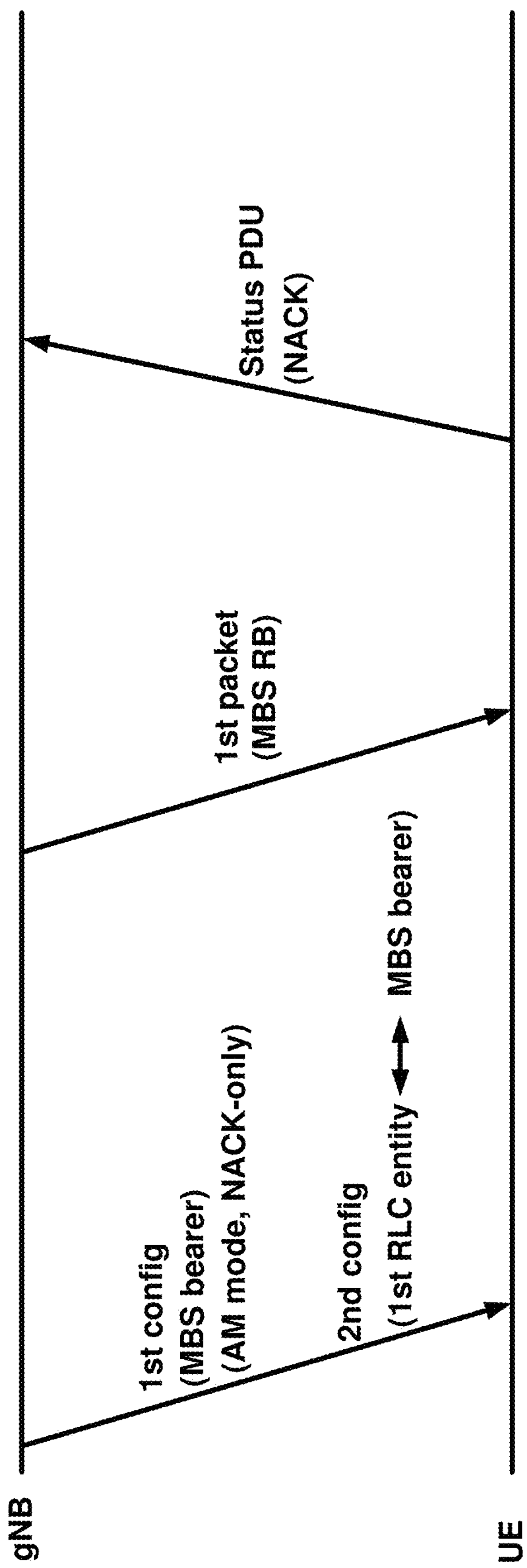
FIG. 24 shows an example process according to some aspects of some of various exemplary embodiments of the present disclosure.

In an example embodiment as shown in FIG. 24, a UE may receive from a base station (BS), one or more messages comprising one or more RRC messages, comprising configuration parameters. The one or more messages may comprise first configuration parameters of an MBS radio bearer. The first configuration parameters may include control information that corresponds to a RadioBearerConfig IE. The RadioBearerConfig IE may correspond to configuration parameters of the MBS radio bearer including PDCP configuration parameters, an identifier of the MBS radio bearer, security parameters, etc.

The one or more messages may further include control information that corresponds to second configuration parameters of a first RLC entity associated with the MBS bearer. The second configuration parameters may comprise an RLCBearer-Config IE that links the MBS radio bearer with an associated RLC entity. For example, the RLCBearer-Config IE may comprise the identifier of the MBS radio bearer indicating that the configuration of the first RLC entity is associated with the MBS radio bearer.

The second configuration parameters may further include control information that the defines that the UE is configured to perform data transfers based on one of three defined modes. For example, the second configuration parameters can include control information, such as an RLC-config IE, that defines that the first RLC entity is an acknowledged mode (AM) RLC entity. The UE can process decoding results associated with received packets, such as a successful or an unsuccessful decoding result. The processed decoding results can be inputs to define how the UE responds according to a defined mode.

In some examples, the second configuration parameters may further indicate or define (e.g., based on one or more configuration parameters (e.g., as part of the RLC-Config IE or as part of the RLCBearer-Config IE)) that the first RLC entity is configured with negative acknowledgement (NACK) only operation. For example, the one or more configuration parameters may have one of two values (e.g., True or False) and in response to the third configuration parameter having a first value (e.g., True) of the two values, the UE may determine that the first RLC entity is configured with NACK only feedback operation.

The UE may receive a packet (e.g., an RLC PDU), associated with the MBS radio bearer, at the first RLC entity of the UE. Based on the second configuration parameters indicating that the first RLC entity operates in a NACK-only mode, and based on the packet not being received/decoded successfully (e.g., not being received/decoded successfully/correctly at the RLC layer), the UE may transmit as a result of a negative decoding result a status PDU comprising a NACK. In some examples, the status PDU may further comprise a sequence number associated with the PDU.

In some examples, based on the second configuration parameters indicating that the first RLC entity operates in a NACK-only mode, and based on the packet being received/decoded successfully (e.g., being received/decoded successfully/correctly at the RLC layer), the UE may not transmit a status PDU. In some examples, the UE may receive a retransmission of the packet. Based on the UE not transmitting a status PDU (e.g., based on the packet being received successfully/correctly), the UE may ignore the retransmitted packet as a processing of the decoding result.

In some examples, the UE may further receive additional control information including third configuration parameters of a second RLC entity associated with the MBS bearer. The second RLC entity of the MBS radio bearer may be a shadow RLC entity. The first RLC entity may be used for multicast and/or broadcast of data associated with the MBS radio bearer and the second RLC entity may be used for unicast retransmission of data associated with the MBS radio bearer. The second RLC entity may be used for unicast retransmission of data associated with the MBS radio bearer if unicast retransmission is required.

In some examples, the UE may switch from the multicast and broadcast transmission of the MBS data associated with the MBS radio bearer to unicast only transmission of the MBS data associated radio bearer. In response to switching to unicast only transmission, the UE may discard the first RLC entity.

In some examples, the UE may synchronize the first RLC entity and the second (e.g. shadow) RLC entity. For example, the values of state variables and/or sequence numbers maintained at the first RLC entity and the second RLC entity may be synchronized.

The first RLC entity and the second RLC entity, both of which are associated with the MBS radio bearer, may be configured with different identities/identifier. For example, the first RLC entity may be associated with a first identity/identifier and the second RLC entity may be associated with a second identity/identifier.

In some examples, the packet may not be successfully received/decoded at the first RLC entity. In response to the first RLC entity being configured with NACK-only operation and the packet not being received/decoded successfully, the first RLC entity of the UE may transmit a status PDU comprising a NACK. In some examples, the status PDU may further comprise an identity/identifier of one of the first RLC entity and the second RLC entity. For examples, the status PDU may comprise the identity/identifier of the first RLC entity. The base station may multicast or broadcast the retransmission of the packet. For examples, the status PDU may comprise the identity/identifier of the second RLC entity. The base station may unicast the retransmission of the packet.

Figure 25:
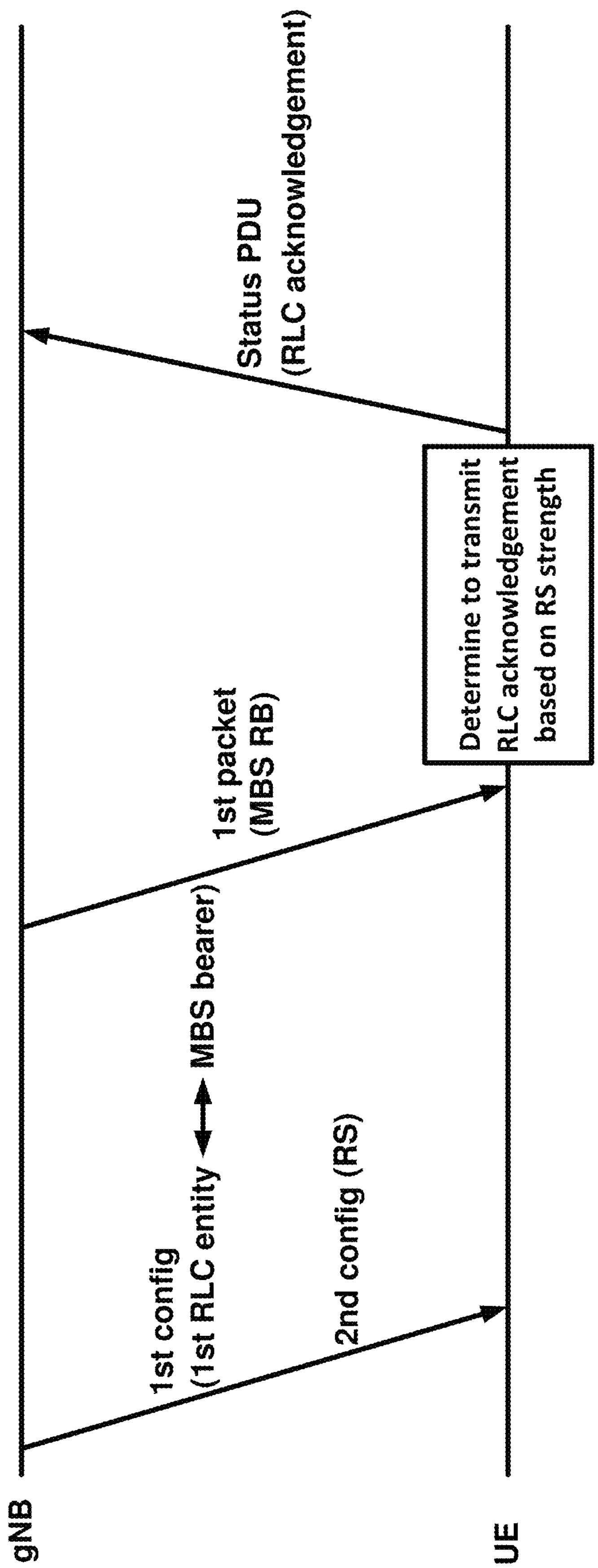
FIG. 25 shows an example process according to some aspects of some of various exemplary embodiments of the present disclosure.

In an example embodiment as shown in FIG. 25, a UE may receive from a base station (BS), one or more messages including control information corresponding to one or more RRC messages, comprising configuration parameters. The one or more messages may comprise first configuration parameters of an RLC entity associated with an MBS radio bearer. For example, the first configuration parameters may comprise an identifier of the MBS bearer indicating that the RLC entity is associated/linked with the MBS radio bearer. For example, the first configuration parameters may further indicate that the RLC entity is an AM RLC entity. The control information can further include second configuration parameters of reference signals that determine how to acknowledge or otherwise respond to received packets.

The UE may receive a packet at the RLC entity. The UE may receive and measure the reference signals based on the second configuration parameters and may determine a signal strength/quality associated with the reference signals. Based on comparing the received signal strength/quality of the reference signals with one or more thresholds (e.g., RRC configured one or more thresholds), the UE may determine how to generate a response action based on the determined RLC acknowledgement (e.g., RLC ACK/NACK). For example, the UE may determine to transmit the RLC acknowledgement based on the determined signal strength/quality of the reference signals being smaller than a threshold. Based on the determination to send the RLC acknowledgement, the UE may transmit a status PDU comprising the RLC acknowledgement. The status PDU may comprise additional information such as a sequence number (e.g., a sequence number associated with the packet).

Figure 26:
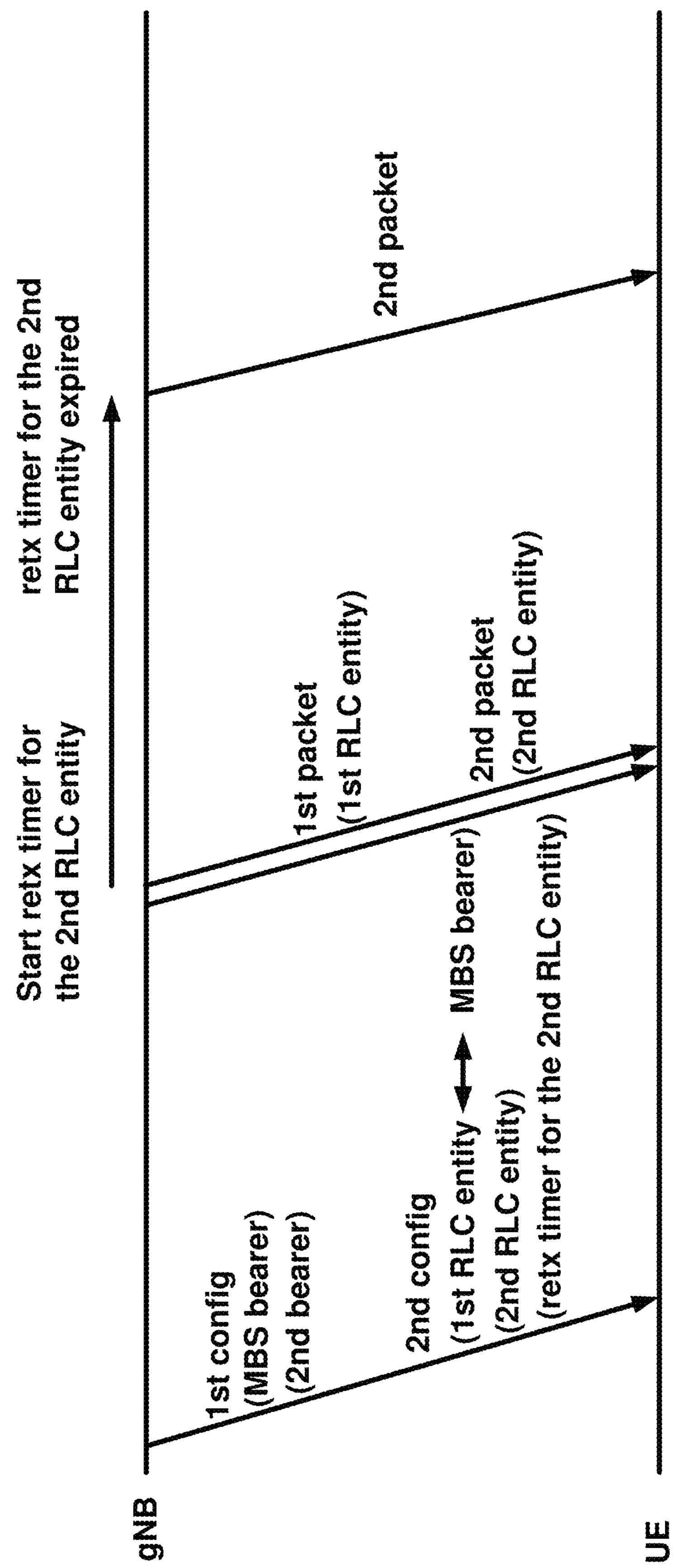
FIG. 26 shows an example process according to some aspects of some of various exemplary embodiments of the present disclosure.

In an example embodiment as shown in FIG. 26, a base station may transmit from a UE, one or more messages including control information corresponding to one or more RRC messages, comprising configuration parameters. The one or more messages may comprise first configuration parameters of an MBS radio bearer and a second radio bearer (e.g., a non-MBS radio bearer). The first configuration parameters may comprise a first RadioBearerConfig IE comprising configuration parameters of the MBS radio bearer including first PDCP configuration parameters, a first identifier of the MBS radio bearer, first security parameters, etc. The first configuration parameters may further comprise a second RadioBearerConfig IE comprising configuration parameters of the second radio bearer including second PDCP configuration parameters, a second identifier of the second radio bearer, second security parameters, etc.

The one or more messages may further include additional control information corresponding to second configuration parameters of a first RLC entity associated with the MBS bearer and a second RLC entity associated with the second radio bearer. The second configuration parameters may comprise a first RLCBearer-Config IE that links the MBS radio bearer with an associated first RLC entity. For example, the first RLCBearer-Config IE may comprise the first identifier of the MBS radio bearer indicating that the configuration of the first RLC entity is associated with the MBS radio bearer.

The second configuration parameters may further comprise a second RLCBearer-Config IE that links the second radio bearer with an associated second RLC entity. For example, the second RLCBearer-Config IE may comprise the second identifier of the second radio bearer indicating that the configuration of the second RLC entity is associated with the second radio bearer. The first RLC entity, associated with the MBS radio bearer, may be commonly established for a plurality of UEs comprising the UE. The second RLC entity, associated with the second radio bearer, may be established for the UE (e.g., only for the UE).

The second configuration parameters may comprise a first RLC-config IE indicating that the first RLC entity is an acknowledged mode (AM) RLC entity and a second RLC-config IE indicating that the second RLC entity is an AM RLC entity. The second configuration parameters may comprise an RLC retransmission timer for the first RLC entity. Specifically, in examples, the control information may explicitly exclude RLC retransmission timer information for the second RLC entity.

The BS may transmit a first packet of the first RLC entity and a second packet of the second RLC entity. The base station may start the RLC retransmission timer for the second RLC entity and may not start the RLC retransmission timer for the second RLC entity. The base station may retransmit the second packet in response to the RLC retransmission timer for the second RLC entity expiring.

In an embodiment, a user equipment (UE) may receive: first configuration parameters of an MBS radio bearer; and second configuration parameters, of a first radio link control (RLC) entity associated with the MBS radio bearer, indicating that: the first RLC entity is an acknowledged mode (AM) RLC entity; and the first RLC entity is configured with negative acknowledgement (NACK) feedback only operation. The UE may receive a packet, associated with the MBS radio bearer, at the first RLC entity. The UE may transmit a status protocol data unit (PDU) comprising a NACK in response to the packet not being successfully decoded at the first RLC entity, otherwise not transmitting a status PDU.

In some embodiments, the packet may be successfully decoded at the first radio link control (RLC) entity; and the UE may not transmit a status protocol data unit (PDU). In some embodiments, the UE may receive a retransmission of the packet; and the UE may ignore the retransmitted packet.

In some embodiments, the UE may receive third configuration parameters of a second radio link layer (RLC) entity associated with the multicast and broadcast services (MBS) radio bearer. In some embodiments, the UE may establish and maintain the first radio link layer (RLC) entity and the second RLC entity. In some embodiments, the first radio link layer (RLC) entity may be associated with a first identity; and the second RLC entity may be associated with a second identity. In some embodiments, the second radio link layer (RLC) entity may be used for unicast retransmission of the multicast and broadcast services (MBS) data. In some embodiments, the second radio link layer (RLC) entity may be activated if a unicast retransmission of the multicast and broadcast services (MBS) data is required. In some embodiments, the UE may discard the second radio link layer (RLC) entity based on switching to unicast-only transmission of the multicast and broadcast services (MBS) data. In some embodiments, the UE may synchronize the first radio link layer (RLC) entity and the second RLC entity. In some embodiments, the synchronizing the first radio link layer (RLC) entity and the second RLC entity may comprise synchronizing RLC sequence numbers at the first RLC entity and the second RLC entity.

In some embodiments, the packet may not be successfully decoded at the first radio link control (RLC) entity; and the user equipment (UE) may transmit a status protocol data unit (PDU) comprising a negative acknowledgement (NACK). In some embodiments, the UE may receive third configuration parameters of a second radio link layer (RLC) entity associated with the MBS radio bearer, wherein: the first radio link layer (RLC) entity may be associated with a first identity; and the second RLC entity may be associated with a second identity. In some embodiments, the status protocol data unit (PDU) may comprise one of the first identity and the second identity. In some embodiments, the UE may receive a retransmission of the packet via the first radio link layer (RLC) entity based on the status protocol data unit (PDU) comprising the first identity. In some embodiments, the retransmission of the packet may be multicast or broadcast to a plurality of user equipments (UEs) comprising the UE. In some embodiments, the UE may receive a retransmission of the packet via the second radio link layer (RLC) entity based on the status protocol data unit (PDU) comprising the second identity. In some embodiments, the retransmission of the packet may be unicast to the UE.

In some embodiments, the status protocol data unit (PDU) may further comprise a sequence number.

In some embodiments, the first configuration parameters may comprise an identifier of the multicast and broadcast services (MBS) radio bearer; and the second configuration parameters may comprise the identifier indicating that the first radio link control (RLC) entity is associated with the MBS radio bearer.

In an embodiment, a UE may receive: first configuration parameters, of a radio link control (RLC) entity associated with an MBS radio bearer; and second configuration parameters of reference signals. The UE may receive a packet, associated with the MBS radio bearer, at the RLC entity. The UE may determine to transmit an RLC acknowledgement based on a signal strength associated with the reference signals. The UE may transmit a status protocol data unit (PDU) comprising the RLC acknowledgement.

In some embodiments, the first configuration parameters may indicate that the first RLC entity is an acknowledged mode (AM) RLC entity.

In some embodiments, determining to transmit the RLC acknowledgement may be based on the signal strength being smaller than a threshold. In some embodiments, the UE may receive a configuration parameter indicating the threshold.

In some embodiments, the RLC acknowledgement may be one of a positive acknowledgement (ACK) or a negative acknowledgement (NACK).

In some embodiments, the status protocol data unit (PDU) may further comprise a sequence number.

In an embodiment, a base station (BS) may transmit to a user equipment (UE): first configuration parameters of an MBS radio bearer and a second radio bearer; and second configuration parameters, of a first radio link control (RLC) entity associated with the MBS radio bearer and a second RLC entity associated with the second radio bearer: indicating that the first RLC entity and the second RLC entity are acknowledged mode (AM) RLC entities; comprising a value of a retransmission timer for the second RLC entity; and not comprising a value of a retransmission timer for the first RLC entity. The BS may transmit a first packet of the first RLC entity and a second packet of the second RLC entity. The BS may start the retransmission timer for the second RLC entity and may not start the transmission timer for the first RLC entity. In response to the retransmission timer for the second RLC entity expiring, the BS may retransmit the second packet.

In some embodiments, the first radio link control (RLC) entity may be commonly established for a plurality of user equipments (UEs) comprising the UE; and the second radio link control (RLC) entity may be established for the UE.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of multicast and broadcast services (MBS) data transmission, comprising:

receiving control information including first configuration parameters and second configuration parameters, wherein the first configuration parameters are associated with an MBS radio bearer wherein the second configuration parameters are associated with a first radio link control (RLC) entity associated with the MBS radio bearer and wherein the second configuration parameters provide information indicating that the first RLC entity is an acknowledged mode (AM) RLC entity;

receiving a packet associated with the MBS radio bearer;

determining a decoding result associated with the decoding the received packet; and processing a decoding result according to the AM RLC entity.

Clause 2. The method of Clause 1, wherein the second configuration parameters further provided information that the first RLC entity is configured with negative acknowledgement (NACK) feedback only operation.

Clause 3. The method of Clause 2, wherein processing the decoding results according to the AM RLC entity includes transmitting a status protocol data unit (PDU) comprising a NACK in response to the packet not being successfully decoded at the first RLC entity.

Clause 4. The method of Clause 2, wherein the decoding results includes an indication that the packet is successfully decoded at the first RLC entity and wherein processing the decoding results according to the AM RLC entity includes not transmitting a status PDU.

Clause 5. The method of Clause 2, further comprising receiving a retransmission of the packet, wherein processing the decoding results according to the AM RLC entity includes ignoring the retransmitted packet.

Clause 6. The method of Clause 1 further comprising receiving control information including third configuration parameters of a second RLC entity associated with the MBS radio bearer.

Clause 7. The method of Clause 6 further comprising establishing and maintaining the first RLC entity and the second RLC entity.

Clause 8. The method of Clause 7, wherein:

the first RLC entity is associated with a first identity; and the second RLC entity is associated with a second identity.

Clause 9. The method of Clause 8, wherein the status PDU comprises one of the first identity and the second identity.

Clause 10. The method of Clause 9 further comprising receiving a retransmission of the packet via the first RLC entity based on the status PDU comprising the first identity.

Clause 11. The method of Clause 10, wherein the retransmission of the packet is multicast or broadcast to a plurality of UEs including the first UE.

Clause 12. The method of Clause 9, further comprising receiving a retransmission of the packet via the second RLC entity based on the status PDU including the second identity.

Clause 13. The method of Clause 12, wherein the retransmission of the packet is unicast to the first UE.

Clause 14. The method of Clause 7, wherein the second RLC entity is used for unicast retransmission of the MBS data.

Clause 15. The method of Clause 14, wherein the second RLC entity is activated if a unicast retransmission of the MBS data is required.

Clause 16. The method of Clause 7 further comprising discarding the second RLC entity based on switching to unicast-only transmission of the MBS data.

Clause 17. The method of Clause 7 further comprising synchronizing the first RLC entity and the second RLC entity.

Clause 18. The method of Clause 17, wherein the synchronizing the first RLC entity and the second RLC entity comprises synchronizing RLC sequence numbers at the first RLC entity and the second RLC entity.

Clause 19. The method of Clause 1, wherein the status PDU further comprises a sequence number.

Clause 20. The method of Clause 1, wherein:

the first configuration parameters comprise an identifier of the MBS radio bearer; and the second configuration parameters comprise the identifier indicating that the first RLC entity is associated with the MBS radio bearer.

Clause 21. A method of multicast and broadcast services (MBS) data transmission, comprising:

receiving control information including first configuration parameters and second configuration parameters, wherein the first configuration parameters, correspond to a radio link control (RLC) entity associated with an MBS radio bearer and wherein the second configuration parameters correspond to configuration parameters of reference signals for configuring responses;

receiving a packet, associated with the MBS radio bearer;

determining to transmit an RLC acknowledgement based processing signal strength associated with the reference signals and the second configuration parameters; and generating a responsive action based on the determination.

Clause 22. The method of Clause 21, wherein generating a responsive action based on the determination includes transmitting a status PDU comprising the RLC acknowledgement.

Clause 23. The method of Clause 21, wherein the first configuration parameters indicate that the RLC entity is an acknowledged mode (AM) RLC entity.

Clause 24. The method of Clause 21, wherein determining to transmit the RLC acknowledgement occurs where the signal strength is smaller than a threshold.

Clause 25. The method of Clause 24 further comprising receiving a configuration parameter indicating the threshold.

Clause 26. The method of Clause 21, wherein the RLC acknowledgement is one of a positive acknowledgement (ACK) or a negative acknowledgement (NACK).

Clause 27. The method of Clause 21, wherein the status PDU further comprises a sequence number.

Clause 28. A method of multicast and broadcast services (MBS) data transmission, comprising transmitting control information including first configuration parameters and second configuration parameters, wherein the first configuration parameters correspond to an MBS radio bearer and a second radio bearer;

wherein the second configuration parameters correspond to a first RLC entity associated with the MBS radio bearer and a second RLC entity associated with the second radio bearer, wherein the second configuration parameters define that the first RLC entity and the second RLC entity are acknowledged mode (AM) RLC entities and wherein the second configuration parameters include a value of a retransmission timer for the second RLC entity and exclude a value of a retransmission timer for the first RLC entity;

transmitting a first packet of the first RLC entity and a second packet of the second RLC entity;

starting the retransmission timer for the second RLC entity and not starting the transmission timer for the first RLC entity; and in response to the retransmission timer for the second RLC entity expiring, retransmitting the second packet.

Clause 29. The method of Clause 28, wherein:

the first RLC entity is commonly established for a plurality of user equipment comprising the first UE; and the second RLC entity is established for the first UE.

Clause 30 An apparatus for utilization in wireless communications comprising:

an antenna for use in transmission of electromagnetic signals;

a memory for maintaining computer-readable code; and a processor for executing the computer-readable code that causes the apparatus to:

receive control information including first configuration parameters and second configuration parameters, wherein the first configuration parameters are associated with an MBS radio bearer wherein the second configuration parameters are associated with a first radio link control (RLC) entity associated with the MBS radio bearer and wherein the second configuration parameters provide information indicating that the first RLC entity is an acknowledged mode (AM) RLC entity;

receive a packet associated with the MBS radio bearer;

determine a decoding result associated with the decoding the received packet; and process a decoding result according to the AM RLC entity.

Clause 31. The apparatus of Clause 30, wherein the second configuration parameters further provided information that the first RLC entity is configured with negative acknowledgement (NACK) feedback only operation.

Clause 32. The apparatus of Clause 31, wherein processing the decoding results according to the AM RLC entity includes transmitting a status protocol data unit (PDU) comprising a NACK in response to the packet not being successfully decoded at the first RLC entity.

Clause 33. The apparatus of Clause 31, wherein the decoding results includes an indication that the packet is successfully decoded at the first RLC entity and wherein processing the decoding results according to the AM RLC entity includes not transmitting a status PDU.

Clause 34. The apparatus of Clause 31, wherein the apparatus further receives a retransmission of the packet, wherein processing the decoding results according to the AM RLC entity includes ignoring the retransmitted packet.

Clause 35. The apparatus of Clause 30, wherein the apparatus further receives control information including third configuration parameters of a second RLC entity associated with the MBS radio bearer.

Clause 36. The apparatus of Clause 35, wherein the apparatus further establishes and maintains the first RLC entity and the second RLC entity.

Clause 37. The apparatus of Clause 36, wherein:

the first RLC entity is associated with a first identity; and the second RLC entity is associated with a second identity.

Clause 38. The apparatus of Clause 37, wherein the status PDU comprises one of the first identity and the second identity.

Clause 39. The apparatus of Clause 38, wherein the apparatus further receives a retransmission of the packet via the first RLC entity based on the status PDU comprising the first identity.

Clause 40. The apparatus of Clause 39, wherein the retransmission of the packet is multicast or broadcast to a plurality of UEs including the first UE.

Clause 41. The apparatus of Clause 38, wherein the apparatus further receives a retransmission of the packet via the second RLC entity based on the status PDU including the second identity.

Clause 42. The apparatus of Clause 41, wherein the retransmission of the packet is unicast to the apparatus.

Clause 43. The apparatus of Clause 36, wherein the second RLC entity is used for unicast retransmission of the MBS data.

Clause 44. The apparatus of Clause 43, wherein the second RLC entity is activated if a unicast retransmission of the MBS data is required.

Clause 45. The apparatus of Clause 36, wherein the apparatus discards the second RLC entity based on switching to unicast-only transmission of the MBS data.

Clause 46. The apparatus of Clause 36, wherein the apparatus synchronizes the first RLC entity and the second RLC entity.

Clause 47. The apparatus of Clause 46, wherein the synchronizing the first RLC entity and the second RLC entity comprises synchronizing RLC sequence numbers at the first RLC entity and the second RLC entity.

Clause 48. The apparatus of Clause 30, wherein the status PDU further comprises a sequence number.

Clause 49. The apparatus of Clause 39, wherein:

the first configuration parameters comprise an identifier of the MBS radio bearer; and the second configuration parameters comprise the identifier indicating that the first RLC entity is associated with the MBS radio bearer.

Clause 50. An apparatus for utilization in wireless communications comprising:

an antenna for use in transmission of electromagnetic signals;

a memory for maintaining computer-readable code; and a processor for executing the computer-readable code that causes the apparatus to:

receive control information including first configuration parameters and second configuration parameters, wherein the first configuration parameters, correspond to a radio link control (RLC) entity associated with an MBS radio bearer and wherein the second configuration parameters correspond to configuration parameters of reference signals for configuring responses;

receive a packet, associated with the MBS radio bearer;

determine to transmit an RLC acknowledgement based processing signal strength associated with the reference signals and the second configuration parameters; and generate a responsive action based on the determination.

Clause 51. The apparatus of Clause 50, wherein generating a responsive action based on the determination includes transmitting a status PDU comprising the RLC acknowledgement.

Clause 52. The apparatus of Clause 50, wherein the first configuration parameters indicate that the RLC entity is an acknowledged mode (AM) RLC entity.

Clause 53. The apparatus of Clause 50, wherein determining to transmit the RLC acknowledgement occurs where the signal strength is smaller than a threshold.

Clause 54. The apparatus of Clause 53, wherein the apparatus further receives a configuration parameter indicating the threshold.

Clause 55. The apparatus of Clause 50, wherein the RLC acknowledgement is one of a positive acknowledgement (ACK) or a negative acknowledgement (NACK).

Clause 56. The apparatus of Clause 50, wherein the status PDU further comprises a sequence number.

Clause 57. An apparatus for utilization in wireless communications comprising:

an antenna for use in transmission of electromagnetic signals;

a memory for maintaining computer-readable code; and a processor for executing the computer-readable code that causes the apparatus to:

transmit control information including first configuration parameters and second configuration parameters, wherein the first configuration parameters correspond to an MBS radio bearer and a second radio bearer;

wherein the second configuration parameters correspond to a first RLC entity associated with the MBS radio bearer and a second RLC entity associated with the second radio bearer, wherein the second configuration parameters define that the first RLC entity and the second RLC entity are acknowledged mode (AM) RLC entities and wherein the second configuration parameters include a value of a retransmission timer for the second RLC entity and exclude a value of a retransmission timer for the first RLC entity;

transmitting a first packet of the first RLC entity and a second packet of the second RLC entity;

starting the retransmission timer for the second RLC entity and not starting the transmission timer for the first RLC entity; and in response to the retransmission timer for the second RLC entity expiring, retransmitting the second packet.

Clause 58. The apparatus of Clause 57, wherein:

the first RLC entity is commonly established for a plurality of user equipment comprising the first user equipment (UE); and the second RLC entity is established for the first UE.

The invention claimed is:

1. A method for a user equipment (UE) for multicast and broadcast services (MBS) data reception, comprising:

receiving, from a base station, one or more radio resource control (RRC) messages including one or more first configuration parameters of a MBS radio bearer, one or more second configuration parameters of a first radio link control (RLC) entity associated with the MBS radio bearer, and one or more third configuration parameters of a second RLC entity associated with a unicast service bearer, wherein the first RLC entity and the second RLC entity are associated with a same unicast scheduling for the UE in a medium access control (MAC) entity;

receiving, from the base station, a packet associated with the MBS radio bearer at the first RLC entity, wherein the packet associated with the MBS radio bearer is demultiplexed with a packet associated with the unicast service bearer at the MAC entity;

transmitting, to the base station, a status protocol data unit (PDU) comprising a negative acknowledgement (NACK) in response to the packet associated with the MBS radio bearer not being received; and receiving the packet associated with the MBS radio bearer retransmitted from the base station at the first RLC entity.

2. The method of claim 1, wherein the first RLC entity is an acknowledged mode (AM) RLC entity.

3. The method of claim 1, wherein the second RLC entity is an AM RLC entity.

4. The method of claim 1, further comprising:

synchronizing the first RLC entity and the second RLC entity.

5. The method of claim 4, wherein the synchronizing the first RLC entity and the second RLC entity comprises synchronizing one or more RLC sequence numbers at the first RLC entity and the second RLC entity.

6. The method of claim 1, wherein the status PDU further comprises a sequence number.

7. A method for a base station for multicast and broadcast services (MBS) data transmission, comprising:

transmitting, to a user equipment (UE), one or more radio resource control (RRC) messages including one or more first configuration parameters of a MBS radio bearer, one or more second configuration parameters of a first radio link control (RLC) entity associated with the MBS radio bearer, and one or more third configuration parameters of a second RLC entity associated with a unicast service bearer, wherein the first RLC entity and the second RLC entity are associated with a same unicast scheduling for the UE in a medium access control (MAC) entity;

transmitting, to the UE, a packet associated with the MBS radio bearer at the first RLC entity, wherein the packet associated with the MBS radio bearer is multiplexed with a packet associated with the unicast service bearer at the MAC entity;

receiving, from the UE, a status protocol data unit (PDU) comprising a negative acknowledgement (NACK) indicating the packet associated with the MBS radio bearer not being received at the UE; and performing a retransmission of the packet associated with the MBS radio bearer at the first RLC entity.

8. The method of claim 7, wherein the first RLC entity is an acknowledged mode (AM) RLC entity.

9. The method of claim 7, wherein the second RLC entity is an AM RLC entity.

10. The method of claim 7, further comprising:

synchronizing the first RLC entity and the second RLC entity.

11. The method of claim 10, wherein the synchronizing the first RLC entity and the second RLC entity comprises synchronizing one or more RLC sequence numbers at the first RLC entity and the second RLC entity.

12. The method of claim 7, wherein the status PDU further comprises a sequence number.

13. A user equipment (UE), comprising:

at least one antenna for use in transmission and reception of one or more electromagnetic signals;

a processor configured to:

receive, from a base station, one or more radio resource control (RRC) messages including one or more first configuration parameters of a MBS radio bearer, one or more second configuration parameters of a first radio link control (RLC) entity associated with the MBS radio bearer, and one or more third configuration parameters of a second RLC entity associated with a unicast service bearer, wherein the first RLC entity and the second RLC entity are associated with a same unicast scheduling for the UE in a medium access control (MAC) entity;

receive, from the base station, a packet associated with the MBS radio bearer at the first RLC entity, wherein the packet associated with the MBS radio bearer is demultiplexed with a packet associated with the unicast service bearer at the MAC entity;

transmit, to the base station, a status protocol data unit (PDU) comprising a negative acknowledgement (NACK) in response to the packet associated with the MBS radio bearer not being received; and receive the packet associated with the MBS radio bearer retransmitted from the base station at the first RLC entity.

14. The UE of claim 13, wherein the first RLC entity is an acknowledged mode (AM) RLC entity.

15. The UE of claim 13, wherein the second RLC entity is an AM RLC entity.

16. The UE of claim 13, wherein the processor is further configured to:

synchronize the first RLC entity and the second RLC entity.

17. The UE of claim 16, wherein the synchronizing the first RLC entity and the second RLC entity comprises synchronizing RLC sequence numbers at the first RLC entity and the second RLC entity.

18. The UE of claim 13, wherein the status PDU further comprises a sequence number.

19. A base station for a wireless communication, comprising:

at least one antenna for use in transmission and reception of one or more electromagnetic signals;

a processor configured to:

transmit, to a user equipment (UE), one or more radio resource control (RRC) messages including one or more first configuration parameters of a multicast and broadcast services (MBS) radio bearer, one or more second configuration parameters of a first radio link control (RLC) entity associated with the MBS radio bearer, and one or more third configuration parameters of a second RLC entity associated with a unicast service bearer, wherein the first RLC entity and the second RLC entity are associated with a same unicast scheduling for the UE in a medium access control (MAC) entity;

transmit, to the UE, a packet associated with the MBS radio bearer at the first RLC entity, wherein the packet associated with the MBS radio bearer is multiplexed with a packet associated with the unicast service bearer at the MAC entity;

receive, from the UE, a status protocol data unit (PDU) comprising a negative acknowledgement (NACK) indicating the packet associated with the MBS radio bearer not being received at the UE; and perform a retransmission of the packet associated with the MBS radio bearer at the first RLC entity.

20. The base station of claim 19, wherein the first RLC entity is an acknowledged mode (AM) RLC entity.

21. The base station of claim 19, wherein the second RLC entity is an AM RLC entity.

22. The base station of claim 19, wherein the processor is further configured to:

synchronize the first RLC entity and the second RLC entity.

23. The base station of claim 22, wherein the synchronizing the first RLC entity and the second RLC entity comprises synchronizing one or more RLC sequence numbers at the first RLC entity and the second RLC entity.

24. The base station of claim 19, wherein the status PDU further comprises a sequence number.

* * * * *